(12) United States Patent
Felbinger et al.

(10) Patent No.: US 10,439,888 B2
(45) Date of Patent: Oct. 8, 2019

(54) INTERCONNECT ENGINE FOR INTERCONNECTION FACILITIES

(71) Applicant: Equinix, Inc., Redwood City, CA (US)

(72) Inventors: Kirk Allan Felbinger, San Jose, CA (US); Steve Ming Wu, Belmont, CA (US)

(73) Assignee: EQUINIX, INC., Redwood City, CA (US)

( * ) Notice: Subject to any disclaimer, the term of this patent is extended or adjusted under 35 U.S.C. 154(b) by 30 days.

(21) Appl. No.: 15/055,990

(22) Filed: Feb. 29, 2016

(65) Prior Publication Data

US 2017/0012831 A1 Jan. 12, 2017

Related U.S. Application Data

(60) Provisional application No. 62/191,206, filed on Jul. 10, 2015.

(51) Int. Cl.
*H04L 12/24* (2006.01)
*G06Q 10/00* (2012.01)
*G06Q 10/06* (2012.01)

(52) U.S. Cl.
CPC ........... *H04L 41/145* (2013.01); *G06Q 10/00* (2013.01); *G06Q 10/06* (2013.01)

(58) Field of Classification Search
CPC .................................................. H04L 41/145
See application file for complete search history.

(56) References Cited

U.S. PATENT DOCUMENTS 8,537,845 B2   9/2013 Waldrop et al.
9,042,235 B1 * 5/2015 Kemmerer, Jr. ...... H04W 40/12
                                                     370/238

(Continued)

FOREIGN PATENT DOCUMENTS

EP      2779590 A1 * 9/2014 ............ H04W 40/12
WO   2012075448 A1   6/2012

OTHER PUBLICATIONS

Rosen et al., "BGP/MPLS IP Virtual Private Networks (VPNs)," RFC 4364, Network Working Group, Feb. 2006, 47 pp.

(Continued)

*Primary Examiner* — Sulaiman Nooristany
(74) *Attorney, Agent, or Firm* — Shumaker & Sieffert, P.A.

(57) ABSTRACT

In some examples, a method includes identifying, by an interconnect engine executing at a computing device, based at least in part on querying telemetry data that indicates interconnections established between interconnection facility customers within a plurality of interconnection facilities by an interconnection facility provider, a set of existing interconnections between a particular interconnection facility customer and at least one target interconnection facility customer within the plurality of interconnection facilities; generating, by the interconnect engine and based at least on part on the set of existing interconnections, a set of prospective interconnections between the particular interconnection facility customer and the target interconnection facility customers for at least one interconnection facility of the plurality of interconnection facilities, wherein the set of prospective interconnections are not included in the telemetry data; and outputting, by the interconnect engine and for display to the particular interconnection facility customer, data indicating the prospective interconnections.

19 Claims, 11 Drawing Sheets

(56) References Cited

U.S. PATENT DOCUMENTS

| | | | |
|---|---|---|---|
| 9,065,872 B1* | 6/2015 | Duarte | H04L 65/403 |
| 9,576,048 B2 | 2/2017 | Akolkar et al. | |
| 2010/0125473 A1 | 5/2010 | Tung et al. | |
| 2011/0137805 A1 | 6/2011 | Brookbanks et al. | |
| 2011/0270968 A1 | 11/2011 | Salsburg et al. | |
| 2012/0151057 A1* | 6/2012 | Paredes | H04L 12/4641 709/225 |
| 2013/0282897 A1* | 10/2013 | Siegel | H04L 43/0876 709/224 |

OTHER PUBLICATIONS

U.S. Appl. No. 14/927,451, by Gagan Maheshwari, filed Oct. 29, 2015.
U.S. Appl. No. 15/072,817, by Kirk Allan Felbinger, filed Mar. 17, 2016.
U.S. Appl. No. 15/099,407, by Juxiang Teng, filed Apr. 14, 2016.
Vargas et al., "Brief: Service Marketplaces Create a Hub for Your Hybrid Ecosystem," For Infrastructure & Operations Professionals, Apr. 22, 2015, 6 pp.
International Search Report and Written Opinion of International Application No. PCT/US2016/041546, dated Sep. 14, 2016, 11 pp.
Office Action from U.S. Appl. No 15/072,817, dated Jun. 12, 2018, 70 pp.
International Preliminary Report on Patentability from International Application No. PCT/US2016/041546, dated Jan. 25, 2018, 7 pp.
Amendment in Response to Office Action dated Jun. 12, 2018, from U.S. Appl. No. 15/072,817, filed Sep. 12, 2018, 22 pp.
Notice of Allowance from U.S. Appl. No. 15/072,817, dated Oct. 17, 2018, 10 pp.

* cited by examiner

INTERCONNECT ENGINE FOR INTERCONNECTION FACILITIES

This application claims the benefit of U.S. Provisional Application No. 62/191,206, filed Jul. 10, 2015, the entire contents of which is incorporated herein by reference.

TECHNICAL FIELD

The invention relates to computer networks and, more specifically, to an interconnection facility for interconnecting customers of the interconnection facility provider.

BACKGROUND

An interconnection facility provider (a "provider") may employ a communication facility, such as a data center or warehouse, in which multiple customers of the provider locate network, server, and storage gear and interconnect to a variety of telecommunications, cloud, and other network service provider(s) with a minimum of cost and complexity. Such interconnection facilities may be shared by the multiple customers. By using interconnection facilities of the provider, customers of the provider including telecommunications providers, Internet Service Providers (ISPs), application service providers, service providers, content providers, and other providers, as well as enterprises, enjoy less latency and the freedom to focus on their core business. Additionally, customers may reduce their traffic back-haul costs and free up their internal networks for other uses.

SUMMARY

In general, techniques of the disclosure are directed to identifying one or more prospective interconnections in order to provide interconnection and/or co-location opportunities that are present in one or more geographically distributed interconnection facilities. To provide interconnection opportunities, an interconnect engine may identify existing interconnections between interconnection facility customers or users at one or more interconnection facilities. Based on an existing interconnection between two customers at a first interconnection facility, the interconnect engine may determine that the two customers are also currently co-located at a second, different interconnection facility but not interconnected. Accordingly, the interconnect engine may identify a prospective interconnection between the two customers at the second interconnection facility and output information to one or both of the customers that an interconnection opportunity exists based on the identified prospective interconnection.

To provide co-location opportunities, the interconnect engine may identify existing interconnections between first and second interconnection facility users at one or more interconnection facilities. Based on an existing interconnection between the first and second interconnection facility users at a first interconnection facility, the interconnect engine may identify a second, different interconnection facility where the second interconnection facility user is connected, but the first interconnection facility user is not. The interconnect engine may determine that a prospective interconnection exists with the second interconnection facility user if the first interconnection facility user co-locates to the second interconnection facility. Accordingly, the interconnect engine may identify a prospective interconnection between the two interconnection facility users at the second interconnection facility and output information to one or both of the interconnection facility users that a co-location opportunity exists based on the identified prospective interconnection.

A method comprising: identifying, by an interconnect engine executing at a computing device, based at least in part on querying telemetry data that indicates interconnections established between interconnection facility customers within a plurality of interconnection facilities by an interconnection facility provider, a set of existing interconnections between a particular interconnection facility customer and at least one target interconnection facility customer within the plurality of interconnection facilities; generating, by the interconnect engine and based at least on part on the set of existing interconnections, a set of prospective interconnections between the particular interconnection facility customer and the target interconnection facility customers for at least one interconnection facility of the plurality of interconnection facilities, wherein the set of prospective interconnections are not included in the telemetry data; and outputting, by the interconnect engine and for display to the particular interconnection facility customer, data indicating the prospective interconnections.

A non-transitory computer-readable storage medium encoded with instructions that, when executed, cause at least one processor of a computing device to: identify, based at least in part on querying telemetry data that indicates interconnections established between interconnection facility customers within a plurality of interconnection facilities by an interconnection facility provider, a set of existing interconnections between a particular interconnection facility customer and at least one target interconnection facility customer within the plurality of interconnection facilities; generate, based at least on part on the set of existing interconnections, a set of prospective interconnections between the particular interconnection facility customer and the target interconnection facility customers for at least one interconnection facility of the plurality of interconnection facilities, wherein the set of prospective interconnections are not included in the telemetry data; and output, for display to the particular interconnection facility customer, data indicating the prospective interconnections.

A computing device comprising: one or more computer processors; and a memory comprising instructions that when executed by the one or more computer processors cause the one or more computer processors to: identify based at least in part on querying telemetry data that indicates interconnections established between interconnection facility customers within a plurality of interconnection facilities by an interconnection facility provider, a set of existing interconnections between a particular interconnection facility customer and at least one target interconnection facility customer within the plurality of interconnection facilities; generate, based at least on part on the set of existing interconnections, a set of prospective interconnections between the particular interconnection facility customer and the target interconnection facility customers for at least one interconnection facility of the plurality of interconnection facilities, wherein the set of prospective interconnections are not included in the telemetry data; and output, for display to the particular interconnection facility customer, data indicating the prospective interconnections.

An apparatus comprising: means for identifying based at least in part on querying telemetry data that indicates interconnections established between interconnection facility customers within a plurality of interconnection facilities by an interconnection facility provider, a set of existing interconnections between a particular interconnection facility customer and at least one target interconnection facility customer within the plurality of interconnection facilities; means for generating, based at least on part on the set of existing interconnections, a set of prospective interconnections between the particular interconnection facility customer and the target interconnection facility customers for at least one interconnection facility of the plurality of interconnection facilities, wherein the set of prospective interconnections are not included in the telemetry data; and means for outputting, for display to the particular interconnection facility customer, data indicating the prospective interconnections.

A method comprising: identifying, by an interconnect engine executing at a computing device, based at least in part on querying telemetry data that indicates interconnections established between interconnection facility customers within a plurality of interconnection facilities by an interconnection facility provider, a set of existing interconnections between a particular interconnection facility customer and a set of target interconnection facility customers within the plurality of interconnection facilities; for each respective target interconnection facility customer of the set of target interconnection facility customers: selecting the respective target interconnection facility customer; selecting an interconnection facility from the set of target interconnection facility customers; in response to determining that the particular interconnection facility customer and the respective target interconnection facility customer are each connected to the selected interconnection facility and are not interconnected at the selected interconnection facility, storing a prospective interconnection for the particular interconnection facility customer and the respective target interconnection facility customer in a set of prospective interconnections; and generating for display, based at least in part on the set of prospective interconnections, one or more prospective interconnections within the selected interconnection facility between the particular user and one or more of the set of target interconnection facility customers.

A method comprising: identifying, by an interconnect engine executing at a computing device, based at least in part on querying telemetry data that indicates interconnections established between interconnection facility customers within a plurality of interconnection facilities by an interconnection facility provider, a set of existing interconnections between a particular interconnection facility customer and at least one target interconnection facility customer within the plurality of interconnection facilities; for each respective interconnection facility, of the plurality of interconnection facilities, that does not include a connection with the particular interconnection facility customer: selecting the respective interconnection facility; in response to determining a count of respective prospective interconnections between the target interconnection facility customers that are connected to the respective interconnection facility and the particular service user, storing a respective score, based at least in part on the count, for the respective interconnection facility; and generating for display, based at least in part on the respective score for the respective prospective interconnections of each respective interconnection facility, one or more indications of interconnection facilities for the particular user to establish connections.

The details of one or more examples are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Figure 1:
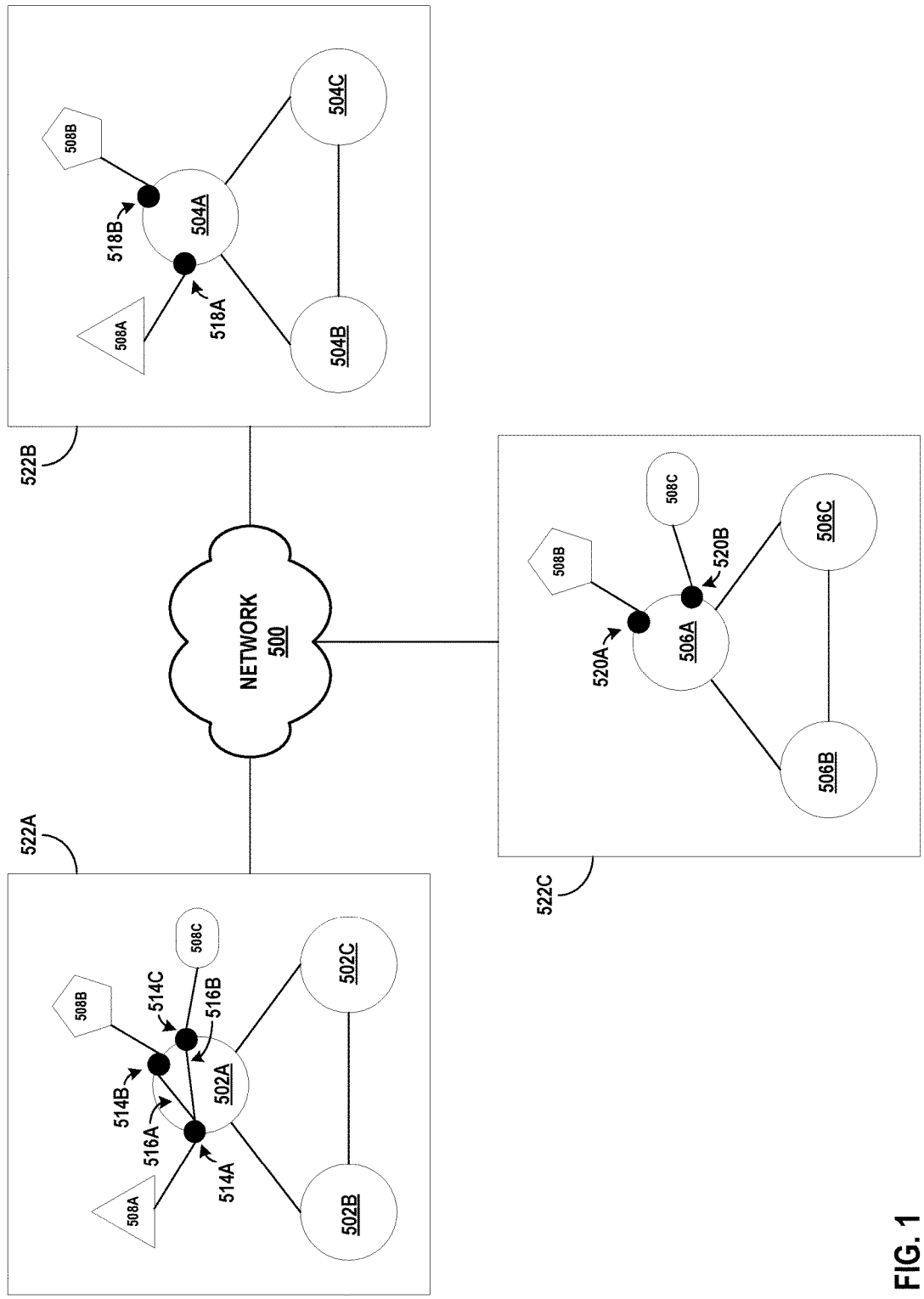
FIG. 1 is a conceptual diagram illustrating co-location and interconnection opportunities between one or more interconnection facility users, in accordance with one or more techniques of the disclosure.

Cloud computing refers to the use of dynamically scalable computing resources accessible via a network 500, such as the Internet. Computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "services" refers not only to services provided by a cloud, but also to a form of service provisioning in which customers contract with service providers for the online delivery of services provided by the cloud. Service providers manage a public, private, or hybrid cloud to facilitate the online delivery of services to one or more customers. In some instances, multiple customers and service providers may have physical and/or logical network interconnections at interconnection facility points that provide for high-speed transmission of information between the customers and service providers. However, in some instances, customers and/or service providers may be unaware of potential interconnection opportunities at geographically dispersed interconnection facility points.

An interconnection facility provider ("provider") employs network infrastructure within interconnection facility that enables customers to connect, using interconnections established within the network infrastructure by the provider, to one another to receive and transmit data for varied purposes. For instance, an interconnection facility may provide data transport services one or more cloud-based services. The interconnection facility in this way offers customers connectivity to a vibrant ecosystem of additional customers including content providers, Internet service providers, carriers, and enterprises. Customers of the interconnection facility may connect for such end-uses as service delivery, content delivery, financial services, and Internet access, to give just a few examples.

An interconnection facility may provide one or more different types of interconnections between customer networks. For instance, an interconnection facility may provide physical or "layer-1" (in the Open Systems Interconnection model (OSI Model)) interconnections between interconnection facility users. Physical interconnections may include physical cross-connects that are established by category 5 or 6 (cat 5/6) cables, coaxial cables, and/or fiber optic cables, for instance. In some examples, an interconnection facility may provide a data link or "layer-2" (in the OSI Model) interconnections between interconnection facility users. In some examples, an interconnection facility that provides layer-2 interconnections may be referred to as an Ethernet Exchange, where Ethernet is the underlying layer-2 protocol. In some examples, an interconnection facility may provide network and/or transfer or "layer-3/4" (in the OSI Model) interconnections between interconnection facility users. In some examples, an interconnection facility that providers layer-3/4 interconnections may be referred to an Internet Exchange, where TCP/IP are the underlying layer-3/4 protocols. For example, an interconnection facility that provides an Internet Exchange may allow customer routers to directly peer with one another using a layer-3 routing protocol, such as Border Gateway Protocol, to exchange routes for facilitating layer-3 traffic exchange. In some examples, an interconnection facility may provide indirect layer-3 routing protocol peering whereby each customer announces its layer-3 routes to an autonomous system (AS) employed by the interconnection facility provider within the interconnection facility network infrastructure. The AS may then relay these routes in conjunction with tunneling or other forwarding information to establish an interconnection between customers. In some examples, an interconnection facility that provides indirect layer-3 routing protocol peering to facilitate service traffic exchange in this way may be referred to as a Cloud-based Services Exchange or, more simply, a Cloud Exchange. Additional description of a cloud exchange are found in U.S. Provisional Appl. No. 62/149,374, filed Apr. 17, 2015, entitled "CLOUD-BASED SERVICES EXCHANGE," the entire content of which is incorporated by reference herein.

In some examples, a "connection" may be a physical or logical coupling between an interconnection facility user in a customer or provider network and an interconnection facility point. An "interconnection" may be a physical or logical coupling between connections that couple at least two interconnection facility users. As such, a network infrastructure configuration within an interconnection facility that enables customer networks to connect to exchange data may be referred to herein as an "interconnection." A cross-connect interconnection may refer to a physical coupling between two interconnection facility users. An Ethernet interconnection may be a layer-2 coupling between two interconnection facility users. An Internet exchange interconnection may be a layer-3/4 coupling between two interconnection facility users. The foregoing examples of interconnection facilities and interconnections are exemplary only and many other types of interconnection facilities and interconnections are possible.

FIG. 1 is a conceptual diagram illustrating co-location and interconnection opportunities between one or more interconnection facility users, in accordance with one or more techniques of the disclosure. FIG. 1 illustrates multiple geographically distributed interconnection facilities 522A-522C. Each of interconnection facilities 522A-522C may be separated by a distance of 50 miles or more in some examples. As shown in FIG. 1, interconnection facility 522A includes multiple, interconnected interconnection facility points 502A-502C. Similarly, interconnection facility 522B includes multiple, interconnected interconnection facility points 504A-504C, and interconnection facility 522C includes multiple, interconnected interconnection facility points 506A-506C.

In the example of FIG. 1, interconnection facility point 502 includes connections 514A-514C by interconnection facility users 508A-508C. For instance, interconnection facility user 508A may be a system or network of the user that is coupled to interconnection facility point 502A by connection 514A. Similarly, interconnection facility user 508B may be a system or network of the user that is coupled to interconnection facility point 502A by connection 514B. Interconnection facility user 508C may be a system or network of the user that is coupled to interconnection facility point 502A by connection 514B. FIG. 1 further illustrates two interconnections 516A and 516B. Interconnection 516A may be a physical or logical coupling between connections 514A and 514B that couple interconnection facility user 508A to interconnection facility user 508B. Interconnection 516B may be a physical or logical coupling between connections 514A and 514C that couple interconnection facility user 508A to interconnection facility user 508B. As described above, a cross-connect interconnection may refer to a physical coupling (e.g., fiber or Cat5/6 cable between two network devices and/or systems of interconnection facility users). An Ethernet interconnection may be a layer-2 coupling between two interconnection facility users, such as one or more Virtual Local Area Networks (VLANs) or other logical networks providing L2 reachability. An Internet exchange interconnection may be a layer-3/4 coupling between two interconnection facility users, such as a layer-3 network path provided by an Internet Exchange. In some examples, an interconnection may be a virtual circuit established at least in part within an interconnection facility.

In some examples, one or more of interconnections 516 may be based on an order for an interconnection being fulfilled by programmable network platform 120 and represented in customer data 602 and/or interconnection data 604. For instance, in some examples, interconnect engine 634 may determine or receive information indicating one or more of interconnections 516 from customer records rather than from a network itself that indicates two customers have a connection. As such, an interconnection entry stored in one or more of customer data 602 and/or 604 may represent a real or actual interconnection in the form of a cable, configuration, and/or virtual connection.

Interconnection facility 522B illustrates an interconnection opportunity between interconnection facility user 508A and interconnection facility user 508B. For instance, interconnect engine 134 of FIG. 2, may determine that interconnection facility user 508A and interconnection facility user 508B have an existing interconnection at interconnection facility 522A. Interconnect engine 134 may determine, for interconnection facilities 522B and 522C, whether interconnection facility user 508A and interconnection facility user 508B have existing connections at the same interconnection facility but do not have interconnections between interconnection facility users 508A and 508B at the interconnection facility. For instance, interconnect engine 134 may determine that interconnection facility user 508A does not have connection to interconnection facility 522C and therefore no prospective connections are presently possible at interconnection facility 522C. However, interconnect engine 134 may determine that interconnection facility user 508A and interconnection facility user 508B are each connected by connections 518A and 518B, respectively, to interconnection facility 522B, but no interconnection exists between interconnection facility users 508A and 508B. Accordingly, interconnect engine 134 may determine that a prospective connection can be made between connections 518A and 518B to interconnect interconnection facility users 508A and 508B. As such interconnect engine 134 may output display data indicating the prospective interconnection to interconnection facility user 508A.

Interconnection facility 522C illustrates a co-location opportunity for service 508A. For instance, interconnect engine 134 of FIG. 2 may determine that interconnection facility user 508A has interconnections with both of interconnection facility users 508B and 508C. As such, interconnect engine 134 may determine, for each exchange that interconnection facility user 504A does not have a connection (e.g., interconnection facility 522C), a count of the interconnection facility users that interconnection facility user 504A already has connections with at other interconnection facilities (e.g., interconnection facility 522A). In the example of FIG. 1, interconnection facility user 508A does not have a connection with interconnection facility 522C, but interconnection facility 522C includes connections for interconnection facility users 508B and 508C. Interconnect engine 134 may determine a count of two for the two interconnection facility users 508B and 508C that have connections at interconnection facility 522C and which are interconnected with interconnection facility user 508A at interconnection facility 522A. Interconnect engine 134 may perform this technique to determine counts for each other interconnection facility for which interconnection facility user 522A does not include a connection. In this way, interconnect engine 134 may determine counts of prospective interconnections that interconnection facility user 508A may make at other interconnection facilities with other interconnection facility users that interconnection facility user 508A is already connected with at interconnection facility 522A.

Upon generating scores, such as counts, for each interconnection facility, interconnect engine 134 may output display data indicating co-location opportunities to interconnection facility user 508A. For instance, the co-location opportunities may be based on the counts which may indicate a number of prospective interconnections that may be made if interconnection facility user 508A establishes connections with other interconnection facilities by co-locating at the other interconnection facilities. In some examples, interconnect engine 134 may rank the scores, such as in descending order. In this way, interconnection facility user 508A may determine which interconnection facilities would provide the most prospective interconnections.

In some examples, interconnect engine 134 may generate scoring data based on possible revenues. For example, for each interconnection facility of the list of prospective interconnection facilities, predictive analytics engine may calculate a revenue estimation based on a number of prospective interconnection facility customers associated with the respective interconnection facility, a sales average for the particular interconnection facility customer, and a conversion rate for the particular interconnection facility customer. For instance, a particular interconnection facility customer may have a conversion rate of 60% and a sales average of $2 million. If a prospective interconnection facility has 75 prospective interconnection facility customers for the particular interconnection facility customer, the prospective interconnection facility may have a revenue estimation of $90 million.

Figure 2:
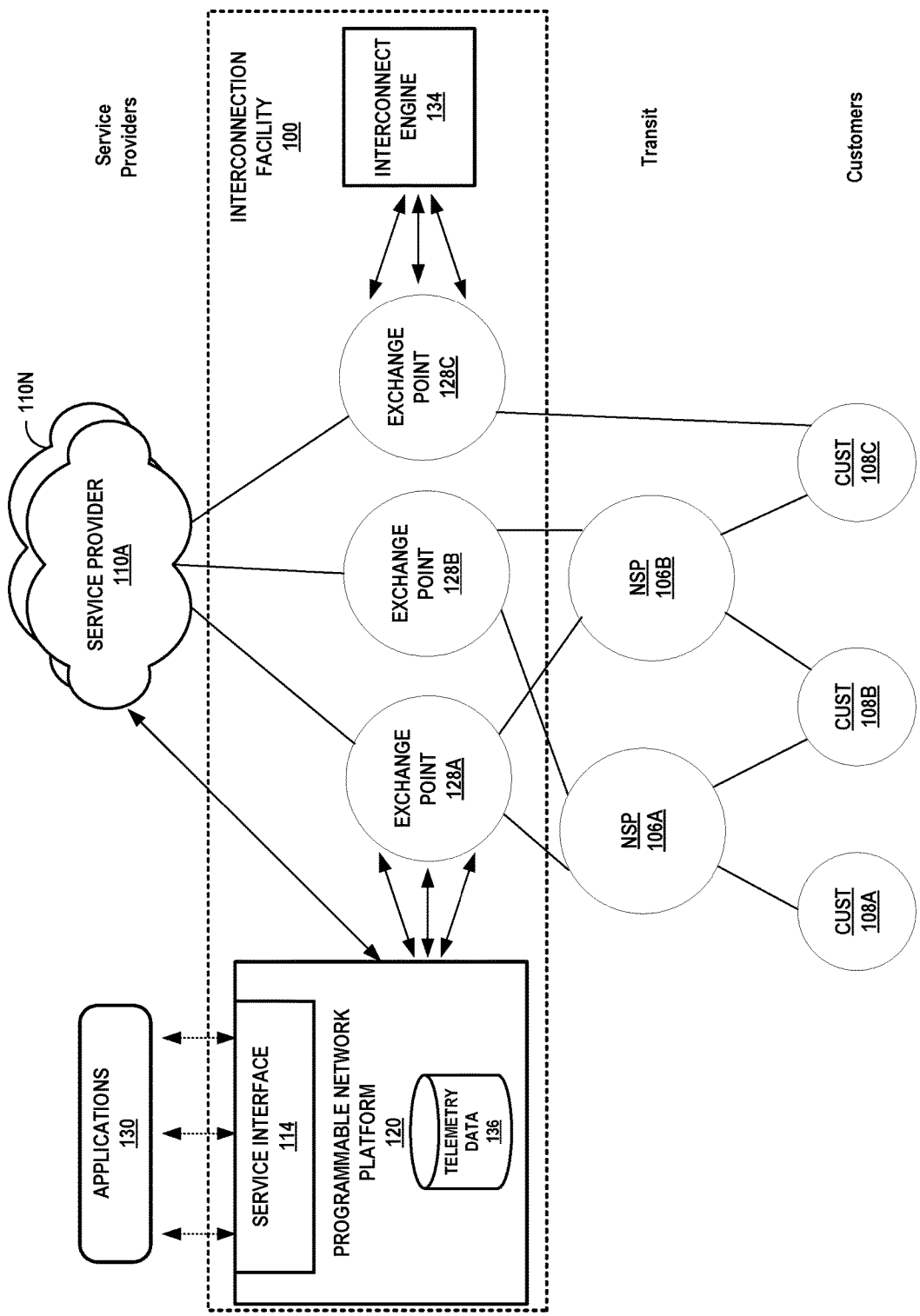
FIG. 2 is a block diagram that illustrates techniques for identifying co-location and interconnection opportunities between service customers and service providers based on existing interconnection and service affinities between service customers and service providers at an interconnection facility, in accordance with techniques of the disclosure.

FIG. 2 is a block diagram that illustrates techniques for identifying co-location and interconnection opportunities between service customers and service providers based on existing interconnection and service affinities between service customers and service providers at an interconnection facility, in accordance with techniques of the disclosure. For instance, interconnection facility 100 may enable customers 108A-108C ("customers 108") to bypass the public Internet to directly connect to services providers 110A-100N ("SPs 110" or "service providers 110") so as to improve performance, reduce costs, increase the security and privacy of the connections, and leverage cloud computing for additional applications. The multiple SPs 110 participate in the interconnection facility by virtue of their having at least one accessible port in the interconnection facility by which a customer can connect to the one or more services offered by the SPs 110, respectively. According to various examples described herein, interconnection facility 100 may allow private networks of any customer to be directly cross-connected to any other customer at a common point, thereby allowing direct exchange of network traffic between the networks of the customers. Customers may include network carriers 106A-106B (collectively, "NSPs 106," or alternatively, "carriers 106"), enterprises, and other users of services offered by one or more service providers.

FIG. 2 illustrates a conceptual view of a network system 2 having a metro-based interconnection facility that provides multiple interconnection facility points according to techniques described herein. Each of interconnection facility points 128A-128D (described hereinafter as "interconnection facility points" and collectively referred to as "interconnection facility points 128") of interconnection facility 100 may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent interconnection facility by which customers and service providers connect to receive and provide, respectively, services. In some examples, a set of metro-based interconnection facilities may be referred to as a "metro-based interconnect facility hub," which may include multiple interconnection facilities geographically located with a metropolitan area. In some examples, each of the multiple interconnection facilities geographically located with a metropolitan area may have low-latency links that connect the multiple interconnection facilities in a topology to provide metro-based interconnection services between customers receiving interconnection services at different interconnection facilities in the metro-based interconnect facility hub. In various examples, interconnection facility 100 may include more or fewer interconnection facility points 128. In some instances, an interconnection facility 100 includes just one interconnection facility point 128. An interconnection facility provider may deploy instances of interconnection facilities 100 in multiple different metropolitan areas, each instance of interconnection facility 100 having one or more interconnection facility points 128.

Each of interconnection facility points 128 includes network infrastructure and an operating environment by which customers 108 receive services from multiple SPs 110. For interconnections at layer-3 or above, customers 108 may receive services directly via a layer 3 peering and physical connection to one of interconnection facility points 128 or indirectly via one of NSPs 106. NSPs 106 provide "transit" by maintaining a physical presence within one or more of interconnection facility points 128 and aggregating layer 3 access from one or customers 108. NSPs 106 may peer, at layer 3, directly with one or more interconnection facility points 128 and in so doing offer indirect layer 3 connectivity and peering to one or more customers 108 by which customers 108 may obtain services from the interconnection facility 100.

In instances in which interconnection facilities 128 offer a cloud exchange, each of interconnection facility points 128, in the example of FIG. 2, is assigned a different autonomous system number (ASN). For example, interconnection facility point 128A is assigned ASN 1, interconnection facility point 128B is assigned ASN 2, and so forth. Each interconnection facility point 128 is thus a next hop in a path vector routing protocol (e.g., BGP) path from service providers 110 to customers 108. As a result, each interconnection facility point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more service providers 110 to customers. In other words, interconnection facility points 128 may internalize the eBGP peering relationships that service providers 110 and customers 108 would maintain on a pair-wise basis. Instead, a customer 108 may configure a single eBGP peering relationship with an interconnection facility point 128 and receive, via the interconnection facility, multiple services from one or more service providers 110. While described herein primarily with respect to eBGP or other layer 3 routing protocol peering between interconnection facility points and customer, NSP, or service provider networks, the interconnection facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108D is illustrated as having contracted with an interconnection facility provider for interconnection facility 100 to directly access layer 3 services via interconnection facility points 128C, 128D. In this way, customer 108D receives redundant layer 3 connectivity to service provider 110A, for instance. Customer 108C, in contrast, is illustrated as having contracted with the interconnection facility provider for interconnection facility 100 to directly access layer 3 services via interconnection facility point 128C and also to have contracted with NSP 106B to access layer 3 services via a transit network of the NSP 106B. Customer 108B is illustrated as having contracted with multiple NSPs 106A, 106B to have redundant access to interconnection facility points 128A, 128B via respective transit networks of the NSPs 106A, 106B. The contracts described above are instantiated in network infrastructure of the interconnection facility points 128 by L3 peering configurations within switching devices of NSPs 106 and interconnection facility points 128 and L3 connections, e.g., layer 3 virtual circuits, established within interconnection facility points 128 to interconnect service provider 110 networks to NSPs 106 networks and customer 108 networks, all having at least one port offering connectivity within one or more of the interconnection facility points 128.

As shown in FIG. 2, programmable network platform 120 may include telemetry data 136. Telemetry data 126 may include metrics about the quantity, type, and definition of network and resource configurations that are configured by programmable network platform 120. Telemetry data 126 may include analytics information from infrastructure data collectors based on raw metrics data for resources used in a particular service.

In some examples, telemetry data 126 may include information that indicates connections of interconnection facility users to interconnection facility points. For instance, an interconnection facility user may include a service customer or service provider. In some examples, a connection may be a physical or logical (e.g., L2 or L3) coupling between an interconnection facility user in a user network (e.g., customer network or provider network) and an interconnection facility point. Telemetry data 126 may include information that indicates interconnections between interconnection facility users at an interconnection facility point. In some examples, an interconnection may be a physical or logical coupling between at least two interconnection facility users in an interconnection facility point.

As shown in FIG. 2, interconnect engine 134 may be included in interconnection facility 100. In other examples, interconnect engine 134 may be implemented within programmable network platform 120. In some examples, interconnect engine 134 may be implemented outside of interconnection facility 100, such as in a different geographic location than interconnection facility 100. In any case, interconnect engine 134 may be operably coupled to programmable network platform 120, such that interconnect engine 134 may communicate with programmable network platform 120. As described in this disclosure, interconnect engine 134 may implemented in hardware, software, or a combination of hardware and software.

In accordance with techniques of the disclosure, interconnect engine 134 may determine interconnection and co-location opportunities based on existing interconnections between interconnection facility users, and output such opportunities to interconnection facility users. An interconnection opportunity may exist when the particular interconnection facility user has an interconnection with target interconnection facility user at a first interconnection facility, and the particular user is co-located with the target interconnection facility user in a second, different interconnection facility but does not have an interconnection with the target interconnection facility user at the second, different interconnection facility. As further described herein, interconnect engine 134 may provide the particular interconnection facility user with an indication of the interconnection opportunity to the other interconnection facility user at the second interconnection facility.

A co-location opportunity may exist when the particular interconnection facility user has an interconnection with a target interconnection facility user at a first interconnection facility, and the particular interconnection facility user is not co-located with the target interconnection facility user in a second, different interconnection facility. In such examples, interconnect engine 134 may provide the particular interconnection facility user with an indication of a co-location opportunity at the second interconnection facility, such that the particular interconnection facility user may establish a connection at the second interconnection facility in order to create an interconnection with the target interconnection facility user.

In operation, to identify interconnection and/or co-location opportunities, interconnect engine 134 may receive telemetry data from programmable network platform 120. Interconnect engine 134 may identify a set of existing interconnections between a particular interconnection facility user and one or more target interconnection facility users at the interconnection facility points. For instance, interconnect engine 134 may determine an interconnection facility user identifier that identifies a particular interconnection facility user. Interconnect engine 134 may send a request or query to programmable network platform 120 for a set of interconnections that identify the target services users to which the particular interconnection facility user is already interconnected. In some examples, the set of interconnections may specify service identifiers of the target interconnection facility users, geographic locations of interconnection facilities, and/or identifiers of interconnection facilities that include the interconnections, to name only a few examples.

Interconnect engine 134 may generate, based at least on part on the set of existing interconnections, a set of prospective interconnections between the particular interconnection facility user and at least one other target interconnection facility user in the one or more interconnection facilities, wherein the prospective interconnection is not included in telemetry data 136. For instance, a prospective interconnection may represent a potential interconnection between two interconnection facility users that does not presently exist. As such, telemetry data 136 does not include a prospective interconnection, but if an interconnection is established between two interconnection facility users, then data indicating the interconnection is stored in telemetry data 136. In various examples, interconnect engine 134 may generate or simulate prospective interconnections to determine which interconnection facilities include interconnection and/or co-location opportunities.

To identify an interconnection opportunity, interconnect engine 134 may determine that the particular interconnection facility user and a target interconnection facility user each have connections at the same interconnection facility. Interconnect engine 134 may determine that a prospective interconnection may be made between the particular interconnection facility user and the target interconnection facility user at a different interconnection facility, where both the particular interconnection facility user and the target interconnection facility user are co-located. In this way, interconnect engine 134 may identify one or more prospective interconnections that may be established between the particular interconnection facility user and other target interconnection facility users at one or more exchanges.

To identify a co-location opportunity, interconnect engine 134 may determine that the particular interconnection facility user has interconnections with one or more target exchange users in one or more interconnection facilities. Interconnect engine 134 may identify one or more interconnection facilities where the particular user does not have a connection but the target interconnection facility users have existing connections. For each of the one or more interconnection facilities where the target interconnection facility users have existing connections but the particular user does not have a connection, interconnect engine 134 may determine a count of the one or more target interconnection facility users at the respective interconnection facility. Interconnect engine 134 may determine that a prospective interconnection may be established by the particular interconnection facility user with a target interconnection facility user if the particular interconnection facility user co-locates or otherwise establishes a connection with the interconnection facility that includes the target interconnection facility user. For each interconnection facility that does not currently include the particular interconnection facility user, interconnect engine 134 may generate a co-location score representing a count of target interconnection facility users at the interconnection facility. As such, a co-location score for an interconnection facility may be proportional to a count of target interconnection facility users for the particular user. For instance, an interconnection facility that has many target source users for a particular customer may have a higher co-location score than an interconnection facility that has fewer target source users for the particular customer.

In some examples, interconnect engine 134 may output, for display to the particular customer, data indicating the prospective interconnections. For instance, interconnect engine 134 may output for display a set of interconnection opportunities. Each interconnection opportunity may specify a target interconnection facility user with which the particular interconnection facility user may establish an interconnection at a particular interconnection facility. In some examples, interconnect engine 134 may output the interconnection opportunities in a ranked ordering. The ranked ordering may be based on one or more criteria, such as but not limited to, count of prospective interconnections for each target interconnection facility user, value of each prospective interconnection for each target interconnection facility user, or a weighted score based on value and number of prospective interconnections, to name only a few examples. The particular interconnection facility user may evaluate the set of interconnection opportunities and communicate with the target interconnection facility users to establish interconnections.

Interconnect engine 134 may output for display a set of co-location opportunities. Each co-location opportunity may specify an interconnection facility where the particular user may establish a connection or presence. As described above, interconnection facilities that include more target interconnection facility users may have higher co-location scores. Accordingly, interconnect engine 134 may output the co-location opportunities in a ranked ordering. The ranked ordering may be based on one or more criteria, such as but not limited to, co-location scores for each interconnection facility, value of each prospective interconnection for each target interconnection facility user at an interconnection facility, or a weighted score based on value and co-location scores, to name only a few examples. The particular interconnection facility user may evaluate the set of interconnection opportunities and communicate with the target interconnection facility users to establish interconnections.

Figure 3:
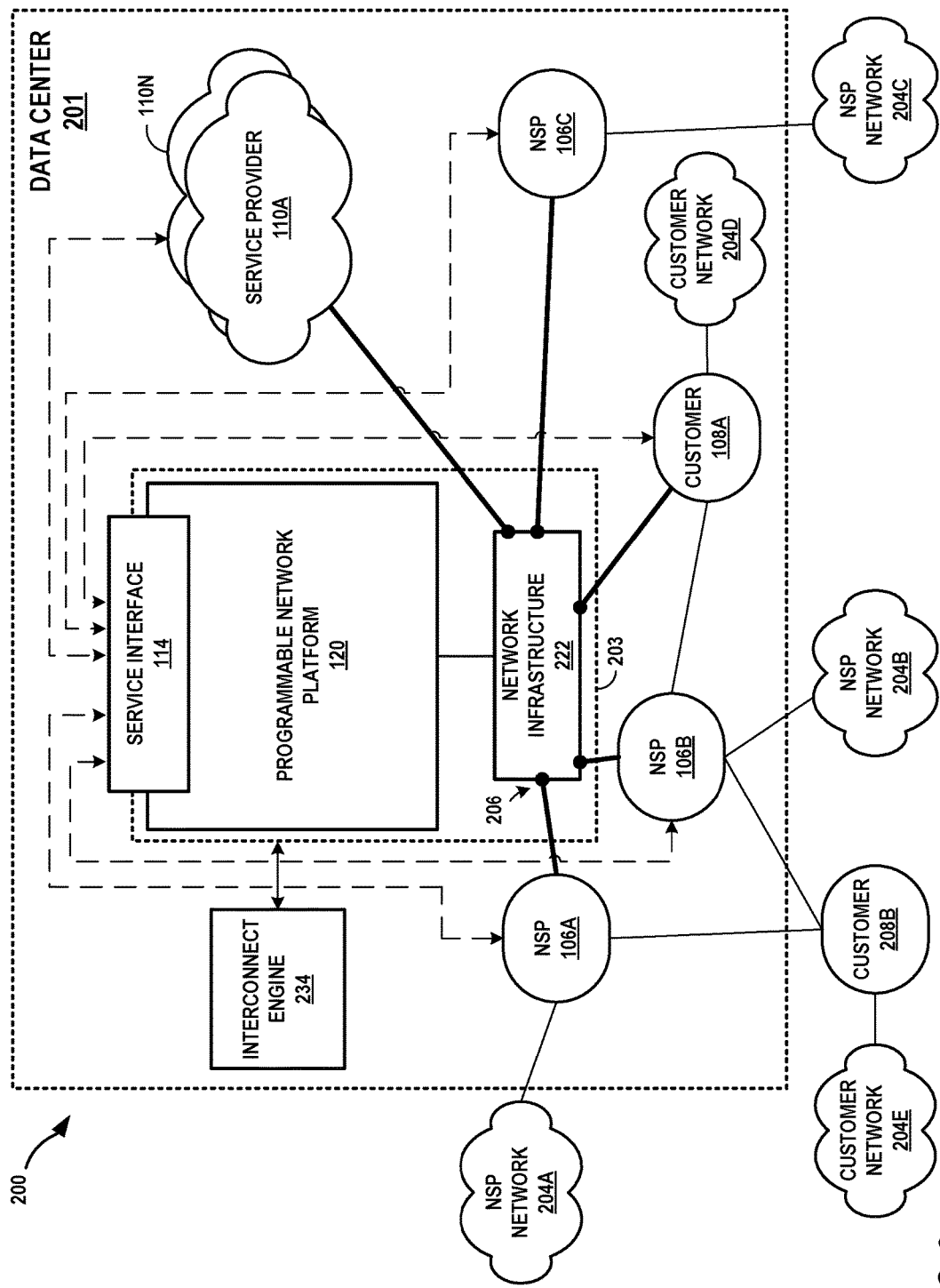
FIG. 3 is a block diagram illustrating a high-level view of a data center that provides an operating environment for an interconnection facility, and an interconnect engine that identifies co-location and interconnection opportunities within the data center, in accordance with techniques of the disclosure.

FIG. 3 is a block diagram illustrating a high-level view of a data center 201 that provides an operating environment for an interconnection facility 200, and an interconnect engine 234 that identifies co-location and interconnection opportunities within the data center, in accordance with techniques of the disclosure. Interconnection facility 200 ("interconnection facility 200") allows a corresponding one of customer networks 204D, 204E and NSP networks 204A-204C (collectively, "'private' or 'carrier' networks 204") of any NSPs 106A-106C or other customers including customers 107A, 107B to be directly cross-connected, via a layer 3 (L3) connection to any other customer network and/or to any of service providers 110A-110N, thereby allowing exchange of service traffic among the customer networks and SPs 110. Data center 201 may be entirely located within a centralized area, such as a warehouse or localized data center complex, and provide power, cabling, security, and other services to NSPs, customers, and service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access services offered by SPs 110 via the interconnection facility 200. In general, customers of SPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such services as are offered by the SPs 110 via the interconnection facility 200.

In this way, interconnection facility 200 streamlines and simplifies the process of partnering SPs 110 and customers 208 (indirectly via NSPs 106 or directly) in a transparent and neutral manner. One example application of interconnection facility 200 is a co-location and interconnection data center in which SPs 110, NSPs 106 and/or customers 107 may already have network presence, such as by having one or more accessible ports available for interconnection within the data center. This allows the participating carriers, customers, and SPs to have a wide range of interconnectivity options in the same facility. Interconnection facility 200 of data center 101 includes network infrastructure 222 that provides a L2/L3switching fabric by which SPs 110 and customers/NSPs interconnect. This enables an NSP/customer to have options to create many-to-many interconnections with only a one-time hook up to the switching network and underlying interconnection platform 203 of interconnection facility 200. In other words, instead of having to establish separate connections across transit networks to access different service providers or different services of one or more service providers, interconnection facility 200 allows customers to interconnect to multiple SPs and services using network infrastructure 222 within data center 201.

By being connected to and utilizing interconnection facility 200, customers can purchase services and reach out to many end users in many different geographical areas without incurring the same expenses typically associated with installing and maintaining multiple virtual connections with multiple SPs 110. For example, NSP 106A can expand its services using network 204B of NSP 106B. By connecting to interconnection facility 200, a NSP 106 may be able to generate additional revenue by offering to sell its network services to the other carriers. For example, NSP 106C can offer the opportunity to use NSP network 204C to the other NSPs.

In some example implementations described herein, interconnection facility 200 includes an interconnection platform 203 that exposes a collection of software interfaces, which may include in some examples and are alternatively referred to herein as application programming interfaces (APIs) 214 in that the APIs 214 define the methods, fields, and/or other software primitives by which applications may invoke the interconnection platform 203. The software interfaces allow NSPs 106 and customers 208 programmable access to capabilities and assets of the interconnection facility 200. The interconnection platform 203 may alternatively be referred to as a controller, provisioning platform, provisioning system, etc., for establishing connectivity between customers and service providers according to techniques described herein.

On the buyer side, the software interfaces presented by the underlying interconnect platform provide an extensible framework that allows software developers associated with the customers of interconnection facility 200 (e.g., customers 208 and NSPs 206) to create software applications that allow and leverage access to the interconnect platform by which the applications may request that the interconnection facility establish connectivity to services offered by any of the SPs 110. For example, these buyer-side software interfaces (or "buyer APIs" of APIs 214) may allow customer applications for NSPs and enterprise customers, e.g., to obtain authorization to access the interconnection facility, obtain information regarding available services, obtain active ports and metro area details for the customer, create virtual circuits of varying bandwidth to access services, including dynamic selection of bandwidth based on a purchased service to create on-demand and need based virtual circuits to service providers, delete virtual circuits, obtain active virtual circuit information, obtain details surrounding SPs partnered with the interconnection facility provider, obtain customized analytics data, and validate partner access to interconnection assets.

On the provider (seller) side, the software interfaces may allow software developers associated with providers to manage their services and to enable customers to connect to their services. For example, these seller-side software interfaces (or "seller APIs" of APIs 214) may allow provider applications to obtain authorization to access the interconnection facility, obtain information regarding available services, obtain active ports and metro area details for the provider, obtain active port details in a given data center for the provider, approve or reject virtual circuits of varying bandwidth to access services created by customers, obtain virtual circuits pending addition and confirm addition of virtual circuits, obtain virtual circuits pending deletion and confirm deletion of virtual circuits, obtain customized analytics data, and validate partner access to interconnection assets.

As further described herein, the APIs 114 facilitate machine-to-machine communication to enable dynamic provisioning of virtual circuits in the interconnection facility for interconnecting customer and provider networks. In this way, the interconnection platform 103 enables the automation of aspects of services provisioning. For example, the software interfaces may provide an automated and seamless way for customers to establish, de-install and manage interconnection with multiple, different providers participating in the interconnection facility.

In some examples, interconnection facility 200 includes an API gateway 212 that executes one or more applications that expose software interfaces defined according to APIs 214. The applications may invoke services that correspond to endpoints of the APIs 214, and the services may themselves invoke the interconnection facility platform service of orchestration engine 218. API gateway 212 may execute on one or virtual machines and/or real servers of data center 201.

In some examples, interconnection facility includes an orchestration engine 218 that organizes, directs and integrates underlying software sub-systems 220 for managing various aspects of interconnection within the network infrastructure 222 as well as services management. The orchestration engine 218 may, for example, provide a rule-drive workflow engine that operates between the APIs 214 and the underlying interconnect platform of interconnection facility 200 that includes sub-systems 220 and network infrastructure 222. In this way, the orchestration engine 218 can be used by customer-proprietary applications and the APIs 214 for direct participation with the interconnection platform 203 of the interconnection facility 200. In other words, the orchestration engine 218 offers an "interconnection facility platform service" having various application engines to handle the API gateway 212 service requests.

As described in further detail below, sub-systems 220 may offer "interconnection facility services" invokable by orchestration engine 218. Sub-systems 220 and orchestration engine 218 may each be centralized or distributed applications and may execute on one or virtual machines and/or real servers of data center 201. Sub-systems 220 may include one or more sub-systems that configure routes, VRFs, VPNs, route targets, et al., within routing and switching devices of network infrastructure 222 so as to facilitate interconnection facility services with end-to-end layer 3 path provisioning.

In the example of FIG. 3, network infrastructure 222 represents the interconnection facility switching fabric and includes multiple ports that may be dynamically interconnected with virtual circuits by, e.g., invoking APIs 214 of the interconnection platform 203. Each of the ports is associated with one of carriers 106, customers 107, and SPs 110. Additional details of an example interconnection platform are described in U.S. Provisional Appl. No. 62/072,976, filed Oct. 30, 2014, entitled "INTERCONNECTION PLATFORM FOR REAL-TIME CONFIGURATION AND MANAGEMENT OF A CLOUD-BASED SERVICES EXCHANGE," the entire content of which is incorporated by reference herein.

As shown in FIG. 3, data center 201 may include interconnect engine 234. Interconnect engine 234 may be operably coupled to programmable network platform 120, such that interconnect engine 234 may communicate with programmable network platform 120. In accordance with techniques of the disclosure, interconnect engine 234 may determine interconnection and co-location opportunities based on existing interconnections between interconnection facility users, and output such opportunities to interconnection facility users. Interconnect engine 234 may provide a particular interconnection facility user with an indication of the interconnection opportunity to the other interconnection facility user at the second interconnection facility.

In some examples, interconnect engine 234 may determine one or more connections that interconnection facility users have with an interconnection facility. For instance, NSP 106A may have a connection 206 with network infrastructure 222 that provides an interconnection facility. Interconnect engine 234 may identify, based at least in part on querying telemetry data that indicates connections of interconnection facility users to interconnection facility points of one or more interconnection facilities, a set of existing interconnections between a particular interconnection facility user, such as NSP 106A and one or more target interconnection facility users at the interconnection facility points. Interconnect engine 234 may generate, based at least on part on the set of existing interconnections, a set of prospective interconnections between the NSP 106A and other target interconnection facility users in one or more interconnection facilities. For instance, interconnect engine 234 may determine customer 108A is interconnected with NSP 106A at a different interconnection facility, and therefore, interconnect engine 234 may determine that there is a prospective interconnection that could be made within network infrastructure 222 between NSP 106A and customer 108A. As such, this may represent an interconnection opportunity.

In another example, interconnect engine 234 may determine that NSP 106A is interconnected with NSP 106B and customer 108A at network infrastructure 222. At a different interconnection facility, each of NSP 106B and customer 108A may have connections, although NSP 106A may not have a connection at the different interconnection facility. Accordingly, interconnect engine 234A may identify two prospective interconnections at the different interconnection facility if NSP 106A were to establish a connection at the different interconnection facility. As such, interconnect engine 234 may identify the different interconnection facility as providing a co-location opportunity for NSP 106A because of the two interconnections that NSP 106A may make with NSP 106B and customer 108A if NSP 106A were to co-locate at the different interconnection facility.

Figure 4A:
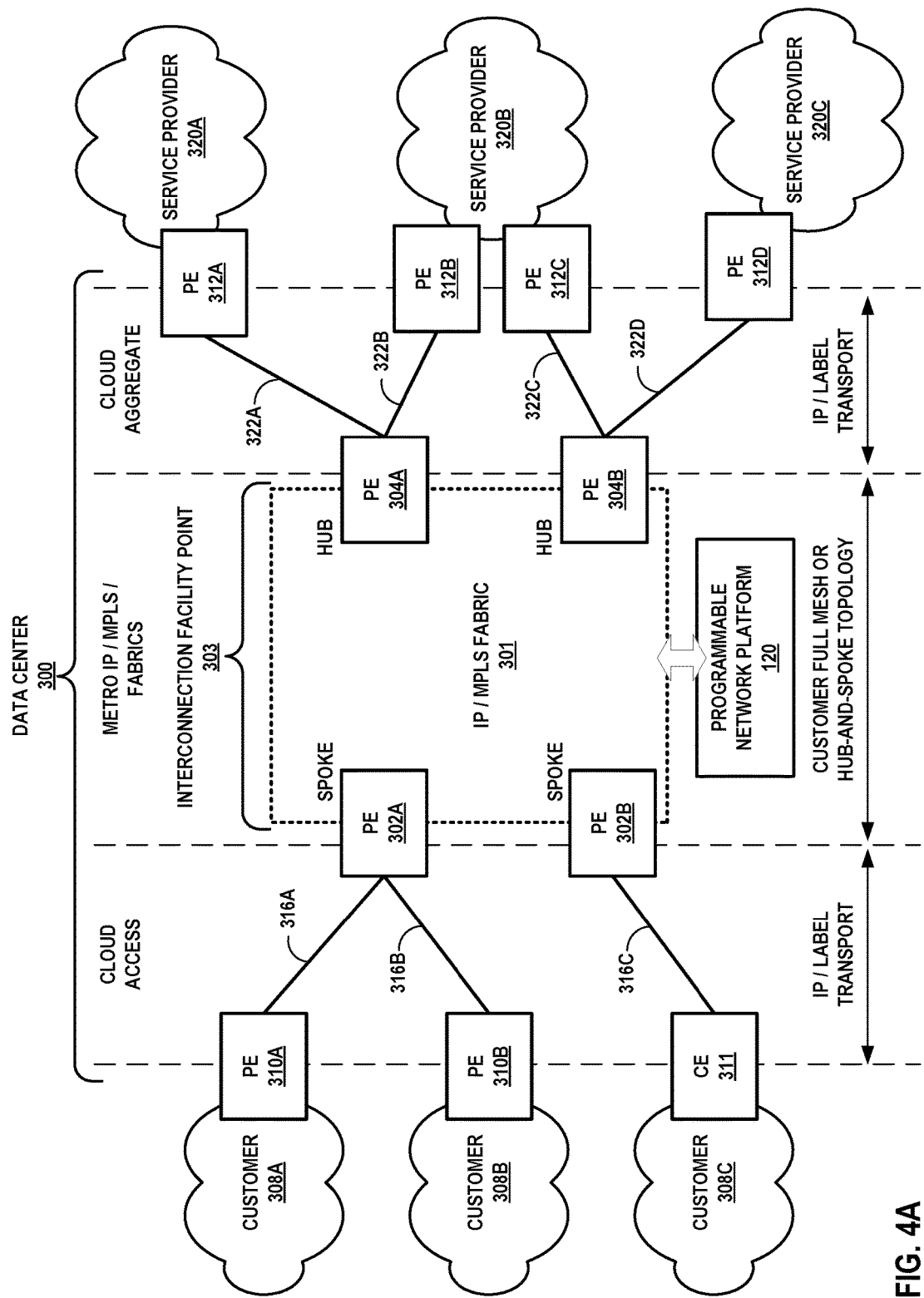
FIGS. 4A-4B are block diagrams illustrating example network infrastructure for an interconnection facility that includes interconnections in which an interconnect engine may identify co-location and interconnection opportunities, in accordance with techniques of the disclosure, in accordance with techniques described in this disclosure.
Figure 4B:
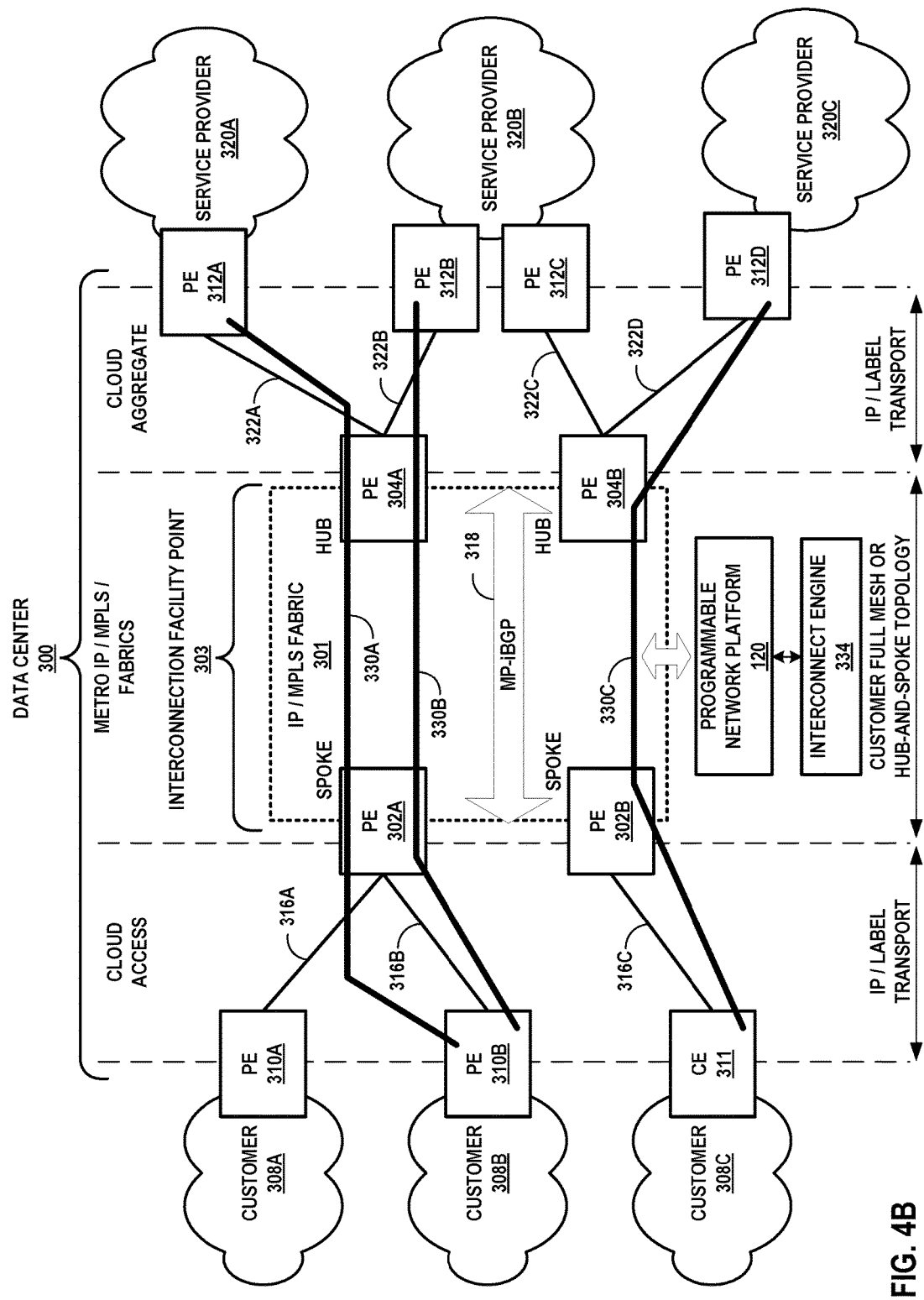

FIGS. 4A-4B are block diagrams illustrating example network infrastructure for an interconnection facility that includes interconnections in which an interconnect engine may identify co-location and interconnection opportunities, in accordance with techniques of the disclosure, in accordance with techniques described in this disclosure. In this example, customer networks 308A-308C (collectively, "customer networks 308"), each associated with a different customer, access an interconnection facility point within a data center 300 in order receive aggregated services from one or more service provider networks 320, each associated with a different service provider 110. Customer networks 308 each include endpoint devices that consume services provided by service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B executes exterior gateway routing protocols to peer with one of PE routers 302A-302B ("PE routers 302" or more simply "PEs 302") over one of network-to-network interface (NNI) links 316A-316B (collectively, "NNI links 316"). Additional details of NNI links and provisioning of NNI links to facilitate layer 2 connectivity within a data center 300 are found in U.S. Pat. No. 8,537,845, issued Sep. 17, 2013, and entitled "Real time configuration and provisioning for a carrier Ethernet exchange," which is incorporated by reference herein in its entirety. Each of NNI links 316, 322 may include a network interface device (NID) that connects customer network 308 or service provider 328 to a network link between the NID and one of PE routers 302, 304. Each of NNI links 316, 322 may represent or include any of a number of different types of links that provide L3/network connectivity.

In this example, customer network 308C is not an autonomous system having an autonomous system number. Customer network 308C may represent an enterprise, network service provider, or other customer network that is within the routing footprint of the interconnection facility point. Customer network includes a customer edge (CE) device 311 that may execute exterior gateway routing protocols to peer with PE router 302B over NNI link 316C. In various examples, any of PEs 310A-310B may alternatively be or otherwise represent CE devices.

NNI links 316 include physical links and may include one or more intermediate switching devices. PE/ASBRs 310A-310B, CE device 311, and PE routers 302A-302B exchange layer 3 packets via NNI links 316. In this respect, NNI links 316 constitute transport links for access via interconnection facility point 303. Interconnection facility point 303 may represent an example of any of interconnection facility points 128. Data center 300 may represent an example of data center 201.

Interconnection facility point 303, in some examples, aggregates customers 308 access to the interconnection facility point 303 and thence to any one or more service providers 320. FIGS. 4A-4B, e.g., illustrate access links 316A-316B connecting respective customer networks 308A-308B to PE router 302A of interconnection facility point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of NNI links 316 to any of NNI links 322. As a result, service provider network 320A, e.g., needs only to have configured a single aggregate link (here, NNI link 322A) in order to provide services to multiple customer networks 308. That is, the service provider operating service provider network 302A does not need to provision and configure separate service links from service provider network 302A to each of PE routers 310, 311, for instance, in order to provide services to each of customer network 308. Interconnection facility point 303 may instead cross-connect aggregate NNI link 322A and PE 312A of service provider network 320A to multiple access NNI links 316 to provide layer 3 peering and network reachability for the services delivery.

In addition, a single customer network, e.g., customer network 308A, need only to have configured a single access link (here, NNI link 316A) to the interconnection facility point 303 within data center 300 in order to obtain services from multiple service provider networks 320 offering services via the interconnection facility point 303. That is, the customer or network service provider operating customer network 308A does not need to provision and configure separate service links connecting customer network 308A to different PE routers 312, for instance, in order to obtain services from multiple service provider networks 320. Interconnection facility point 303 may instead cross-connect access NNI link 316A (again, as one example) to multiple aggregate NNI links 322 to provide layer 3 peering and network reachability for the services delivery to customer network 308A.

Service provider networks 320 each includes servers configured to provide one or more services to users. These services may be categorized according to service types, which may include for examples, applications/software, platforms, infrastructure, virtualization, and servers and data storage. Example services may include content/media delivery, cloud-based storage, cloud computing, online gaming, IT services, etc.

Service provider networks 320 include PE routers 312A-312D that each executes an exterior gateway routing protocol, e.g., eBGP, to exchange routes with PE routers 304A-304B (collectively, "PE routers 304") of interconnection facility point 303. Each of service provider networks 320 may represent a public, private, or hybrid cloud. Each of service provider networks 320 may have an assigned autonomous system number or be part of the autonomous system footprint of interconnection facility point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple service provider networks 320 to provide a data center-based 'transport' and layer 3 cross-connect. Whereas service provider-based IP backbone networks require wide-area network (WAN) connections with limited bandwidth to transport service traffic from layer 3 services providers to customers, the interconnection facility point 303 as described herein 'transports' service traffic and cross-connects service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and service provider network 320 may connect via respective NNI links to the same PE router of IP/MPLS fabric 301.

NNI links 316, 322 may include attachment circuits that associate traffic, exchanged with the connected customer network 308 or service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over NNI link 316A, the LSP being an attachment circuit for a VRF configured in PE 302A. As another example, PE 304A may exchange IP packets with PE 312A on a bidirectional label-switched path (LSP) operating over NNI link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for services, with PEs 304 implementing service hubs and PEs 302 being configured as spokes of the hubs (for various hub-and-spoke instances/arrangements). A hub-and-spoke arrangement ensures that service traffic is enabled to flow between a hub PE and any of the spoke PEs, but not between different spoke PEs. As described further below, in a hub-and-spoke arrangement for data center-based IP/MPLS fabric 301 and for southbound service traffic (i.e., from a SP to a customer) PEs 302 advertise routes, received from PEs 310, to PEs 304, which advertise the routes to PEs 312. For northbound service traffic (i.e., from a customer to a SP), PEs 304 advertise routes, received from PEs 312, to PEs 302, which advertise the routes to PEs 310.

For some customers of interconnection facility point 303, the interconnection facility point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 4B, interconnection facility point 303 is configured to implement multiple layer 3 virtual circuits 330A-330C (collectively, "virtual circuits 330") to interconnect customer network 308 and service provider networks 322 with end-to-end IP paths. Each of service providers 320 and customers 308 may be an endpoint for multiple virtual circuits 330, with multiple virtual circuits 330 traversing one or more attachment circuits between a PE/PE or PE/CE pair for the IP/MPLS fabric 301 and the SP/customer. A virtual circuit 330 represents a layer 3 path through IP/MPLS fabric 301 between an attachment circuit connecting a customer network to the fabric 301 and an attachment circuit connecting a service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of service provider network 320A may send a route for service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the interconnection facility point 303 (e.g., to a BGP autonomous system path (AS_PATH) attribute) and specifying PE router 302A as the next hop router. Interconnection facility point 303 is thus an autonomous system "hop" in the path of the autonomous systems from customers 308 to service providers 320 (and vice-versa), even though the interconnection facility point 303 may be based within a data center. PE router 310B installs the route to a routing database, such as a BGP routing information base (RIB) to provide layer 3 reachability to service provider network 320A. In this way, interconnection facility point 303 "leaks" routes to service provider networks 320 to customer networks 308, without service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from service provider network 320A to customer network 308B. In the example of virtual circuit 330B, PE routers 312B, 304A, 302A, and 310B exchange routes for customer network 308B and service provider 320B in a manner similar to that described above for establishing virtual circuit 330B. As a result, interconnection facility point 303 within data center 300 internalizes the peering connections that would otherwise be established between PE 310B and each of PEs 312A, 312B so as to perform aggregation for multiple layer 3 services provided by different service provider networks 320A, 320B and deliver the multiple, aggregated layer 3 services to a customer network 308B having a single NNI link 316B to the interconnection facility point 303. Absent the techniques described herein, fully interconnecting customer networks 308 and service provider networks 320 would require 3×3 peering connections between each of PEs 310 and each of PEs 312. For instance, PE 310A would require a layer 3 peering connection with each of PEs 312. With the techniques described herein, interconnection facility point 303 may fully interconnect customer networks 308 and service provider networks 320 with one peering connection per site PE (i.e., for each of PEs 310 and PEs 312) by internalizing the layer 3 peering and providing data center-based 'transport' between access and aggregate interfaces.

In examples in which IP/MPLS fabric 301 implements BGP/MPLS IP VPNs or other IP VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of service provider networks 320 attached to the basic backbone L3VPN. Each advanced L3VPN constitutes a service delivery network from a service provider network 320 to one or more customer networks 308, and vice-versa. In this way, interconnection facility point 303 enables any service provider network 320 to exchange service traffic with any customer network 308 while internalizing the layer 3 routing protocol peering connections that would otherwise be established between pairs of customer networks 308 and service provider networks 320 for any service connection between a given pair. In other words, the interconnection facility point 303 allows each of customer networks 308 and service provider networks 320 to establish a single (or more for redundancy or other reasons) layer 3 routing protocol peering connection to the data center-based layer 3 cross-connect. By filtering routes from service provider networks 320 to customer networks 308, and vice-versa, PEs 302, 304 thereby control the establishment of virtual circuits 330 and the flow of associated service traffic between customer networks 308 and service provider networks 320 within a data center 300. Routes distributed into MP-iBGP mesh 318 may be VPN-IPv4 routes and be associated with route distinguishers to distinguish routes from different sites having overlapping address spaces.

As shown in FIG. 4B, data center 300 may include interconnect engine 334. Like FIGS. 2 and 3, interconnect engine 334 may be operably coupled to programmable network platform 120, such that interconnect engine 334 may communicate with programmable network platform 120. In accordance with techniques of the disclosure, interconnect engine 334 may determine interconnection and co-location opportunities based on existing interconnections between interconnection facility users, and output such opportunities to interconnection facility users. Interconnect engine 334 may provide a particular interconnection facility user with an indication of the interconnection opportunity to the other interconnection facility user at the second interconnection facility.

In some examples, interconnect engine 334 may determine one or more connections that interconnection facility users have with an interconnection facility. For instance, customer 308B may have a connection 316B with PE 302A. Interconnect engine 334 may identify, based at least in part on querying telemetry data that indicates connections of interconnection facility users to interconnection facility points of one or more interconnection facilities, a set of existing interconnections between a particular interconnection facility user, such as customer 308B and one or more target interconnection facility users at the interconnection facility points. Interconnect engine 334 may generate, based at least on part on the set of existing interconnections, a set of prospective interconnections between the customer 308B and other target interconnection facility users in one or more interconnection facilities. For instance, interconnect engine 334 may determine customer 308B is interconnected with service provider 320C at a different interconnection facility, and therefore, interconnect engine 334 may determine that there is a prospective interconnection that could be made within interconnection facility point 303 between customer 308B and service provider 320C. As such, this may represent an interconnection opportunity.

In another example, interconnect engine 334 may determine that customer 308B is interconnected with service providers 320A and 320B at interconnection facility point 303. At a different interconnection facility, each of service providers 320A and 320B may have connections, although customer 308B may not have a connection at the different interconnection facility. Accordingly, interconnect engine 334 may identify two prospective interconnections at the different interconnection facility if customer 308B were to establish a connection at the different interconnection facility. As such, interconnect engine 334 may identify the different interconnection facility as providing a co-location opportunity for customer 308B because of the two interconnections that customer 308B may make with service providers 320A and 320B were to co-locate at the different interconnection facility.

Figure 5:
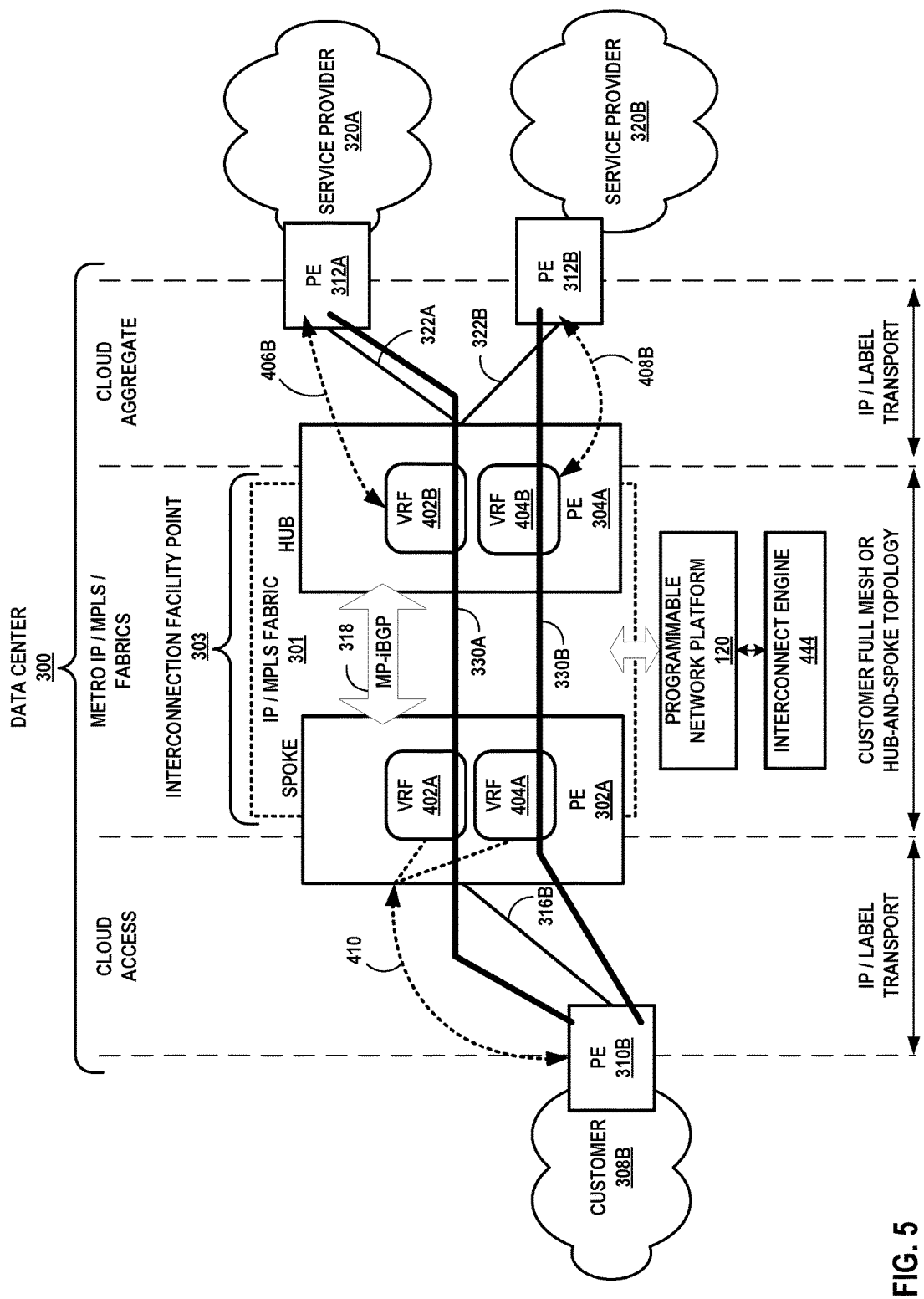
FIG. 5 is a block diagram illustrating an example of a data center-based interconnection facility point in which routers of the interconnection facility point are configured with VPN routing and forwarding instances for routing and forwarding aggregated service traffic from multiple service provider networks to a customer network, according to techniques described herein.

FIG. 5 is a block diagram illustrating an example of a data center-based interconnection facility point in which routers of the interconnection facility point are configured with VPN routing and forwarding instances for routing and forwarding aggregated service traffic from multiple service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B.

In this example, PE 304A operates BGP or other route distribution protocol peering connections 406B, 408B with respective PEs 312A, 312B to exchange routes with respective service provider networks 320A, 320B. PE 302A operates a BGP or other route distribution protocol peering connection 410 with PE 310B to exchange routes with customer network 308B. In some examples, as described further below with respect to FIG. 2, PEs 302A, 304A may be statically configured with routes for the site networks.

An administrator for interconnection facility point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Interconnection facility point 303 may thus provide dedicated service provider access to customer network 308B by way of private and/or public routes for the service provider networks 320. In the northbound direction, interconnection facility point 303 may provide dedicated service provider distribution to multiple customer networks 308 by way of private and/or public routes for the customer networks 308. Neither PE 310B nor any of PEs 302A, 304A need access to the full Internet BGP routing table in order to reach service provider networks 320 or customer networks 308. Moreover, PEs 302A, 304A may be configured to aggregate customer/SP routes and/or service traffic based on any one or more of physical, IP, service, and VRFs.

As shown in FIG. 5, data center 300 may include interconnect engine 444. Like FIGS. 2-4, interconnect engine 444 may be operably coupled to programmable network platform 120, such that interconnect engine 334 may communicate with programmable network platform 120. In accordance with techniques of the disclosure, interconnect engine 334 may determine interconnection and co-location opportunities based on existing interconnections between interconnection facility users, and output such opportunities to interconnection facility users. Interconnect engine 334 may provide a particular interconnection facility user with an indication of the interconnection opportunity to the other interconnection facility user at the second interconnection facility. For instance, as further shown in FIGS. 7-8 interconnect engine 444 may output, for display to the particular customer, data indicating the prospective interconnections.

Figure 6:
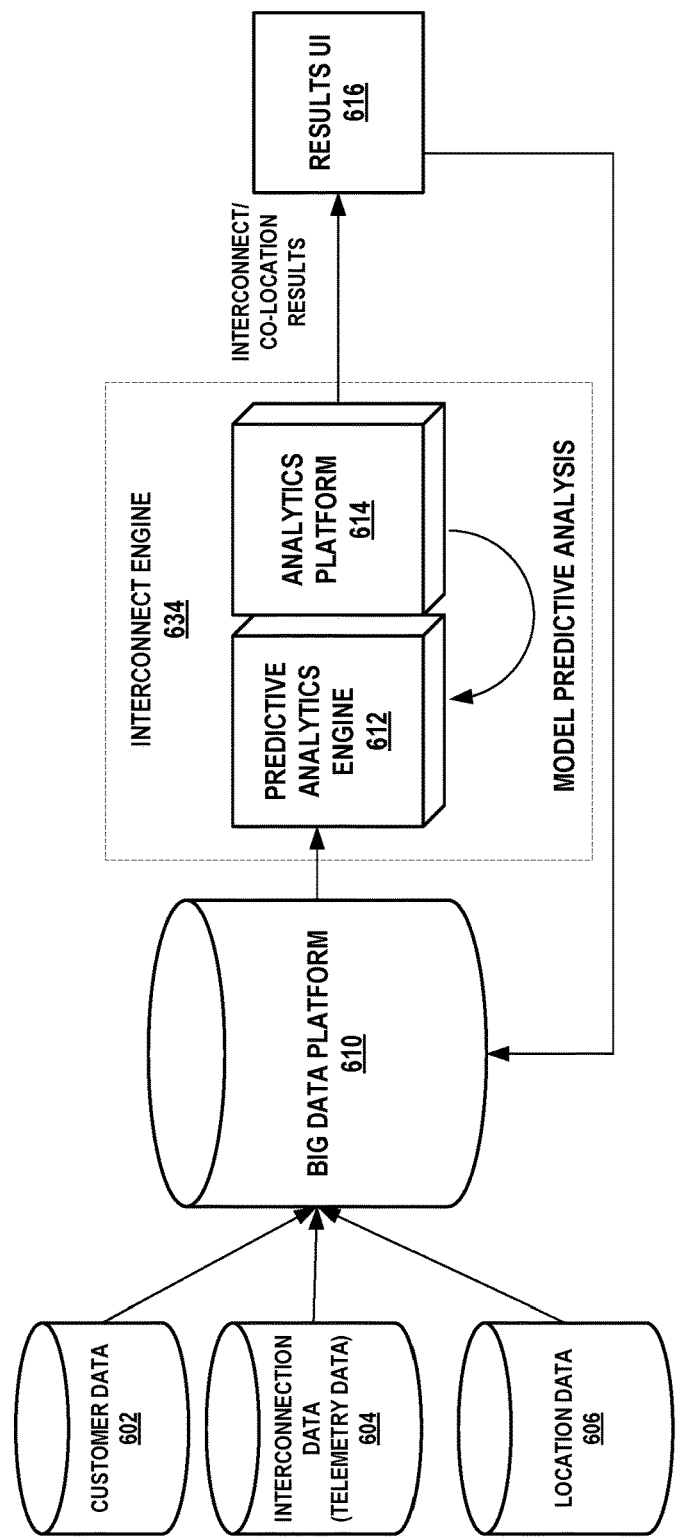
FIG. 6 is a conceptual diagram of logical components that are used to provide interconnection and co-location opportunities, in accordance with techniques of this disclosure.

FIG. 6 is a conceptual diagram of logical components that are used to provide interconnection and co-location opportunities, in accordance with techniques of this disclosure. Each of components 602-620 and 634 may be implemented in hardware, software, or a combination of hardware and software. As shown in FIG. 6, interconnect engine 634 may include a predictive analytics engine 612 and an analytics platform 614, which identify interconnection and/or co-location opportunities. To generate interconnection opportunities interconnect engine 634 may query big data platform 610 for information, such as but not limited to interconnection facility user information, connection and interconnection information, and interconnection facility information, to name only a few examples. Using this information interconnect engine 634 may identify interconnection and/or co-location opportunities for interconnection facility users.

In the example of FIG. 6, big data platform 610 may provide analysis, capture, data curation, search, sharing, storage, transfer, visualization of data received from, but not limited to, customer data 602, interconnection data (or telemetry data) 604, and location data 606. In some examples, each of customer data 602, interconnection data 604, location data 606, and big data platform 610 may be implemented in a Relational Database Management System (RDBMS), Object Database Management System (ODBMS), Online Analytical Processing (OLAP) system, or Big Data Computing system, to name only a few examples. Big data platform may receive data from one or more of customer data 602, interconnection data 604, location data 606 on a periodic, asynchronous, or real-time basis.

Customer data 602 may include information that identifies an interconnection facility user, billing information for the interconnection facility user, location information for the interconnection facility user, co-location/interconnection preference information for the interconnection facility user, to name only a few examples. Interconnection data 604 (or telemetry data) may, as described in FIG. 2, include metrics about the quantity, type, and definition of network and resource configurations that are configured by programmable network platform 120. Interconnection data 604 may include analytics information from infrastructure data collectors based on raw metrics data for resources used in a particular service. In some examples, interconnection data 604 includes connection information that indicates a connection that an interconnection facility user has to an interconnection facility point or interconnection facility. In some examples, interconnection data 604 includes interconnection information that indicates an interconnection between at least two users at an interconnection facility point or interconnection facility. Location data 606 may include information that identifies geographic locations of interconnection facilities, interconnection facility points, interconnection facility user systems, and/or interconnection facility user networks, to name only a few examples.

As shown in FIG. 6, interconnect engine 634 includes predictive analytics engine 612 and analytics platform 614. For purposes of this disclosure, analytics platform 614 may determine one or more prospective interconnections for interconnection and/or co-location opportunities based on existing interconnections that a particular interconnection facility user has with one or more other target interconnection facility users. Predictive analytics platform 612 may predict one or more prospective interconnections for interconnection and/or co-location opportunities based on predicted interconnections that a particular interconnection facility user may establish with one or more other target interconnection facility users, based on one or more criteria.

In accordance with techniques of the disclosure, analytics platform 614 may request customer information from big data platform 610 for a particular customer to determine interconnection and/or co-location opportunities that are based on prospective interconnections. For example, analytics platform 614 may retrieve a set of interconnection facility user identifiers from big data platform 610 and select an interconnection facility user identifier for the particular interconnection facility user. Based on the interconnection facility user identifier, analytics platform 614 may determine a set of target interconnection facility users with which the particular interconnection facility user has an existing interconnection.

Analytics platform 614 may identify an interconnection opportunity by determining that the particular interconnection facility user and a target interconnection facility user from the set of target interconnection facility users each have connections at the same interconnection facility. Analytics platform 614 may determine that a prospective interconnection may be made between the particular interconnection facility user and the target interconnection facility user at a different interconnection facility, where both the particular interconnection facility user and the target interconnection facility user are colocated. For each target interconnection facility user in the set of target interconnection facility users, analytics platform may determine whether a prospective interconnection may be made between the particular interconnection facility user and the respective target interconnection facility user at a different interconnection facility. Accordingly, analytics platform 614 may generate a set of prospective interconnections that may be provided to the particular interconnection facility user. For instance, analytics platform 614 may provide the set of prospective interconnections in a results user interface 616. Details of results user interface 616 for interconnection opportunities are further described in FIGS. 7-8. In some examples, analytics platform 614 may send one or more messages to the particular interconnection facility user, such as an email, text message, or other suitable communication.

Analytics platform 614 may identify a co-location opportunity by determining that the particular interconnection facility user has interconnections with one or more target interconnection facility users in one or more interconnection facilities. Analytics platform 614 may identify one or more interconnection facilities from big data platform 610 where the particular user does not have a connection but the target interconnection facility users have existing connections. For each of the one or more interconnection facilities where the target interconnection facility users have existing connections but the particular user does not have a connection, analytics platform 614 may determine a count of the one or more target interconnection facility users at the respective interconnection facility. Analytics platform 614 may determine that a prospective interconnection may be established by the particular interconnection facility user with a target interconnection facility user if the particular interconnection facility user co-locates or otherwise establishes a connection with the interconnection facility that includes the target interconnection facility user. For each interconnection facility that does not currently include the particular interconnection facility user, analytics platform 614 may generate a co-location score representing a count of target interconnection facility users at the interconnection facility, as described in FIGS. 1-2.

As with interconnection opportunities, analytics platform 614 may generate a set of prospective co-location opportunities that may be provided to the particular interconnection facility user. For instance, analytics platform 614 may provide the set of co-location opportunities in the results user interface 616. Details of results user interface 616 for co-location opportunities are further described in FIG. 7. In some examples, analytics platform 614 may send one or more messages to the particular interconnection facility user, such as an email, text message, or other suitable communication.

In some examples, the particular interconnection facility user may interact with results user interface 616 to view and select interconnection and/or co-location opportunities for further action. For instance, the particular interconnection facility user may provide a user input that causes a message to be sent from the particular interconnection facility user to a target interconnection facility user. The message may indicate a request to establish an interconnection based on an interconnection opportunity presented by results user interface 616. In another example, the particular interconnection facility user may provide a user input, in response to viewing a co-location opportunity, which causes a programmable network platform to initiate a connection of the particular interconnection facility user with an interconnection facility that the particular interconnection facility user was not previously connected.

In some examples, predictive analytics engine 612 may generate scoring data based on possible revenues. For example, for each interconnection facility of the list of prospective interconnection facilities, predictive analytics engine may calculate a revenue estimation based on a number of prospective interconnection facility customers associated with the respective interconnection facility, a sales average for the particular interconnection facility customer, and a conversion rate for the particular interconnection facility customer. For instance, a particular interconnection facility customer may have a conversion rate of 30% and a sales average of $1 million. If a prospective interconnection facility has 100 prospective interconnection facility customers for the particular interconnection facility customer, the prospective interconnection facility may have a revenue estimation of $30 million.

Figure 7:
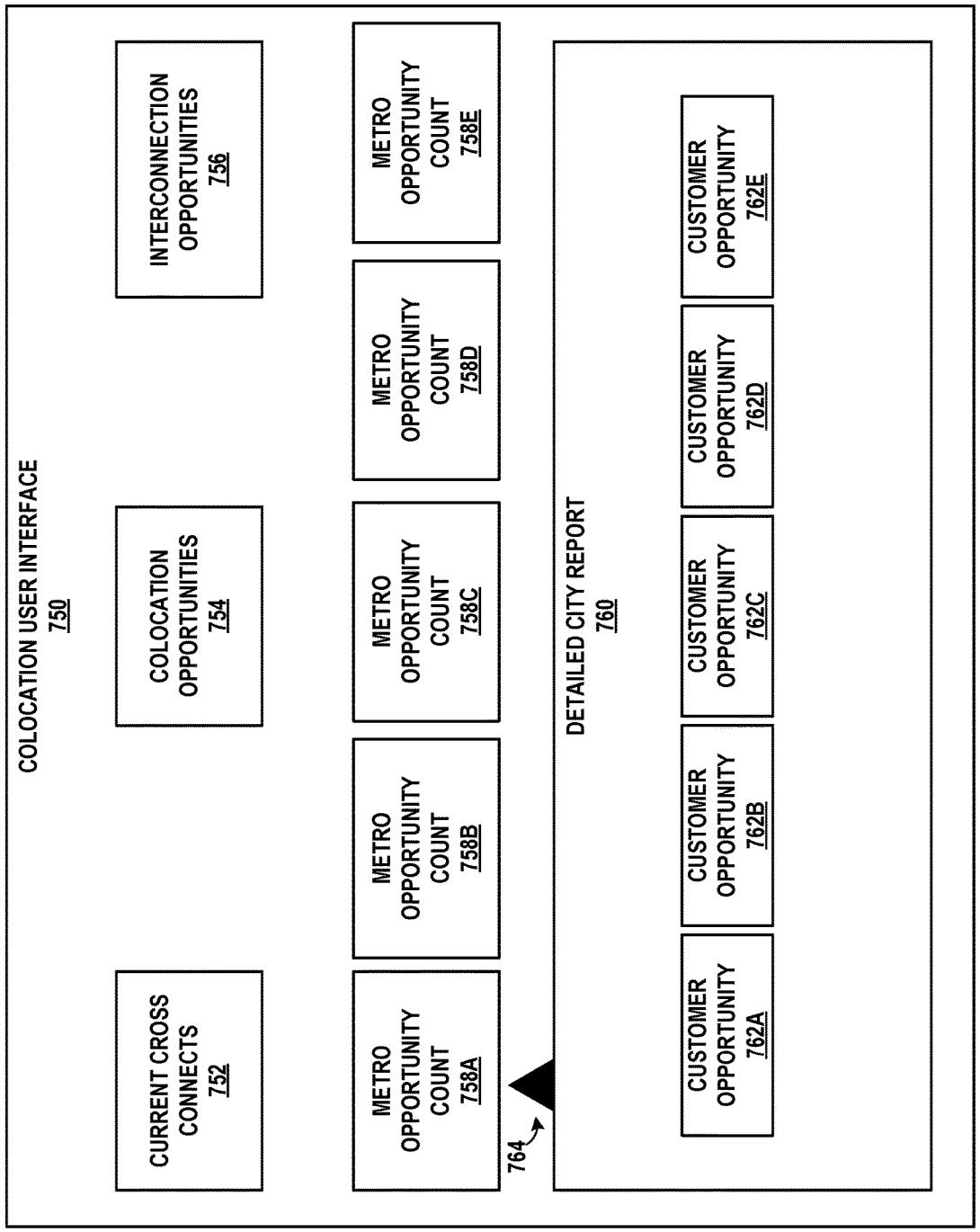
FIG. 7 is an example user interface that indicates one or more co-location opportunities based on one or more prospective interconnections, in accordance with techniques of the disclosure.

FIG. 7 is an example user interface that indicates one or more co-location opportunities based on one or more prospective interconnections, in accordance with techniques of the disclosure. In some examples, co-location user interface 750 may be generated by interconnect engine 134 as described in FIG. 2. Co-location user interface 750 may be generated by interconnect engine 134 for a particular interconnection facility user, such that the information included in co-location user interface 750 is specific to the particular interconnection facility user. Co-location user interface 750 may be output for display a computing device of a particular interconnection facility user for which interconnect engine 134 determined co-location opportunities. Co-location user interface 750 may include one or more user interface elements to output information, such as but not limited to: labels, input fields, drop-down menus, buttons, images, tab controls, and navigation controls to name only a few examples.

Co-location user interface 750 may include a current cross connects user interface element 752. User interface element 752 may display a total count of cross-connects (or interconnections) that couple the particular interconnection facility user to other interconnection facility users in one or more interconnection facilities. Co-location user interface 750 may also include a co-location opportunity user interface element 754. User interface element 754 may include a total count of co-location opportunities that are determined by interconnect engine 134, as described in accordance with techniques of this disclosure. Co-location user interface 750 may also include an interconnection opportunities user interface element 756. User interface element 756 may include a total count of interconnection opportunities that are determined by interconnect engine 134, as described in accordance with techniques of this disclosure.

In some examples, co-location user interface 750 includes metro opportunity count user interface elements 758A-758E. Although five metro opportunity count user interface elements are illustrated for example purposes, any number of metro opportunity count user interface elements may be include in co-location user interface 750. Each of user interface elements 758A-758E may correspond to a different geographic location or metro area that includes an interconnection facility. Each of user interface elements 758A-758E may include a co-location score as determined by interconnect engine 134 in accordance with techniques of the disclosure. For instance, each of user interface elements 758A-758E may include a count of prospective interconnections that may be established by the particular interconnection facility user if the particular interconnection facility user were to co-locate to the geographic location or metro area associated with the respective user interface element. As an example, user interface element 758A may correspond to the city of London. User interface element 758A may include a count of a number prospective interconnections with target interconnection facility users in London, if the particular interconnection facility user were to co-locate or otherwise establish a connection with an interconnection facility in London.

In some examples, co-location user interface 750 may include a detailed city report 760 that includes customer opportunity user interface elements 762A-762E. Although five customer opportunity user interface elements are illustrated for example purposes, any number of customer opportunity user interface elements may be include in co-location user interface 750. Each of customer opportunity user interface elements 762A-762E may identify a specific target interconnection facility user at geographic location or metro area associated with one of user interface elements 758A-758E. As an example, user interface element 762A may include a name, logo, or other identifier of a particular target interconnection facility user. Graphical indicator 764 indicates that user interface elements 762A-762E represent target interconnection facility users associated with a geographic location or metro area that corresponds to user interface element 758A. As such, each target interconnection facility user associated with one of user interface elements 762A-762E has a connection to an interconnection facility in the geographic location or metro area associated with user interface element 758A.

Although not shown in FIG. 7, co-location user interface 750 may include one or more user interface elements that allow a particular interconnection facility user to provide user input, in response to viewing a co-location opportunity, which causes a programmable network platform to initiate a connection of the particular interconnection facility user with an interconnection facility that the particular interconnection facility user was not previously connected. Co-location user interface 750 may also include one or more other user interface elements (not shown) to communicate with a programmable network platform and/or one or more other target services users.

In other examples, the location score for each of user interface elements 758A-758E may alternatively or additionally include a revenue estimation for the particular metro or city. For example, for each interconnection facility of the list of prospective interconnection facilities depicted by user interface elements 758A-758E, predictive analytics engine may calculate a revenue estimation based on a number of prospective interconnection facility customers associated with the respective interconnection facility, a sales average for the particular interconnection facility customer, and a conversion rate for the particular interconnection facility customer. For instance, a particular interconnection facility customer may have a conversion rate of 75% and a sales average of $4 million. If a prospective interconnection facility has 40 prospective interconnection facility customers for the particular interconnection facility customer, the prospective interconnection facility may have a revenue estimation of $120 million.

As described above, each customer opportunity 762A-762E may be associated with a particular score. For example, the scoring data may indicate how closely the two interconnection facility customer's business types are related, or how closely the service provided by the particular interconnection facility customer matches the service desired by the prospective interconnection facility customer. In other examples, a more detailed revenue estimation can be calculated for each customer. For instance, a revenue estimation can be estimated based on the amount of gigabytes (GB) transferred per month by the particular customer. The customer associated with customer opportunity 762A may transfer 500,000 GB per month. If the particular interconnection facility customer charges $10 per GB transferred, and the particular interconnection facility customer has a conversion rate of 30%, then the customer associated with customer opportunity 762A may have a revenue estimation of $1.5 million.

Figure 8:
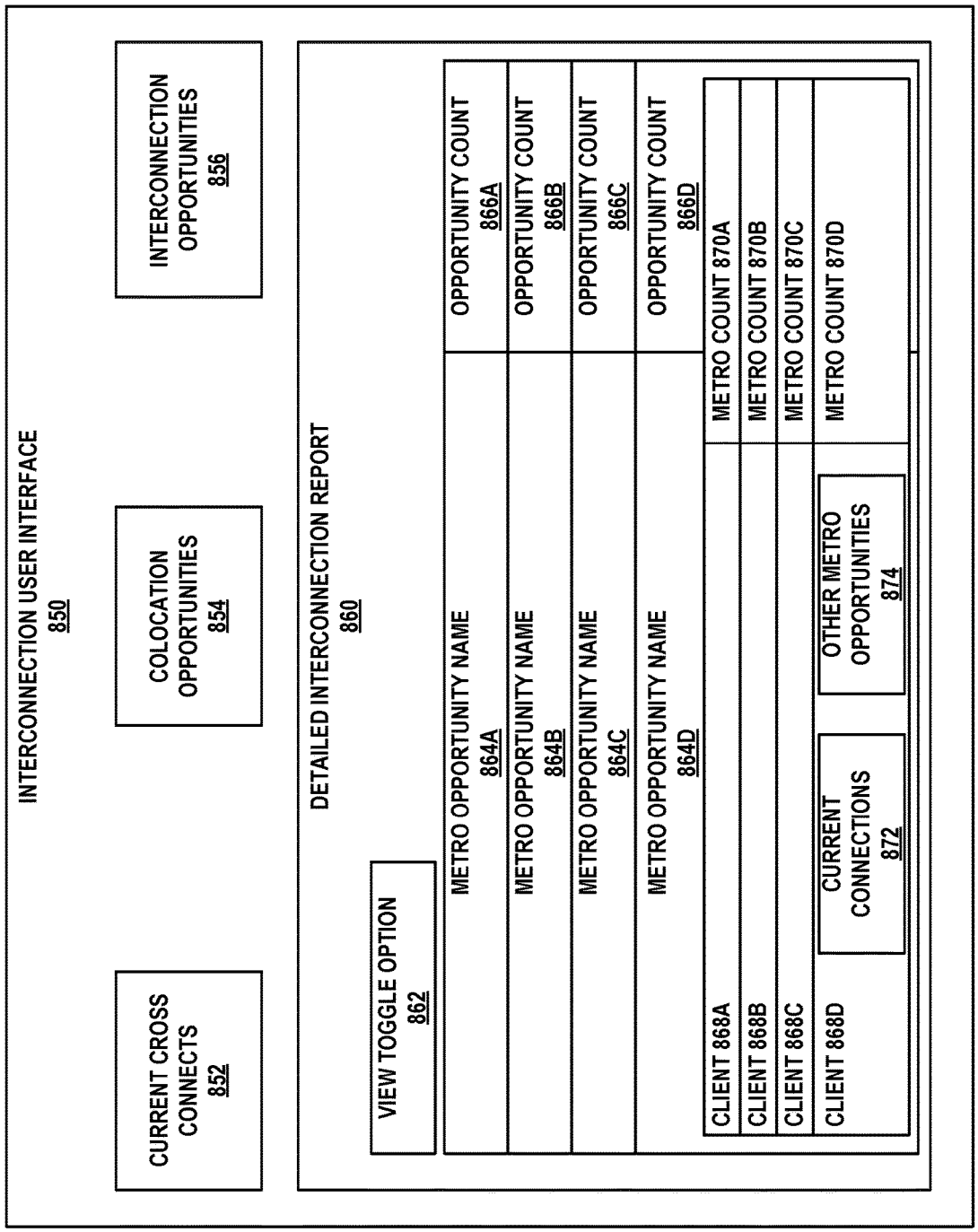
FIG. 8 is an example user interface that indicates one or more interconnection opportunities based on one or more prospective interconnections, in accordance with techniques of the disclosure.

FIG. 8 is an example user interface that indicates one or more interconnection opportunities based on one or more prospective interconnections, in accordance with techniques of the disclosure. In some examples, interconnection user interface 850 may be generated by interconnect engine 134 as described in FIG. 2. Interconnection user interface 850 may be generated by interconnect engine 134 for a particular interconnection facility user, such that the information included in interconnection user interface 850 is specific to the particular interconnection facility user. Interconnection user interface 850 may be output for display a computing device of a particular interconnection facility user for which interconnect engine 134 determined interconnection opportunities. Interconnection user interface 850 may include one or more user interface elements to output information, such as but not limited to: labels, input fields, drop-down menus, buttons, images, tab controls, and navigation controls to name only a few examples.

Interconnection user interface 850 may include a current cross connects user interface element 852. User interface element 852 may display a total count of cross-connects (or interconnections) that couple the particular interconnection facility user to other interconnection facility users in one or more interconnection facilities. Interconnection user interface 850 may also include a co-location opportunity user interface element 854. User interface element 854 may include a total count of co-location opportunities that are determined by interconnect engine 134, as described in accordance with techniques of this disclosure. Interconnection user interface 850 may also include an interconnection opportunities user interface element 856. User interface element 856 may include a total count of interconnection opportunities that are determined by interconnect engine 134, as described in accordance with techniques of this disclosure.

In some examples, interconnection user interface 850 includes a detailed interconnection report 860. Interconnection user interface 850 may include a view toggle option user interface element 862. User interface element 862 may allow a user to select, for display, a set of one or more interconnection opportunities based on metro area or geographic location. For instance, user interface element 862 may be a drop-down menu that includes one or more names of metro areas, geographic locations, and/or customers. In some examples, detailed interconnection report may include one or more metro opportunity name user interface elements 864A-864D. Although four metro opportunity name user interface elements are illustrated for example purposes, any number of metro opportunity name user interface elements may be included in interconnection user interface 850. Each of user interface elements 864A-864D may identify a different metro area or geographic location that includes an interconnection facility. Each of user interface elements 864A-864D may have a corresponding opportunity count user interface element 866A-866D. Each of user interface elements 866A-866D may include a count of prospective interconnections that a particular interconnection facility user, for which interconnection user interface 850 is generated, may establish with one or more other target interconnection facility users. For instance, user interface element 864A may include the value "Seattle" and user interface element 866A may include a value "78," which represents 78 ; interconnection opportunities in the Seattle metro area.

In some examples, detailed interconnection report 860 may include a more granular listing of one or more specific target interconnection facility users that are each included in a metro area or geographic location. For instance, detailed interconnection report 860 includes client user interface elements 868A-868D and a set of corresponding metro count user interface elements 870A-870D. Each of client user interface elements 868A-868D may include information that identifies a target user, such as a name, logo, or other identifier of a target interconnection facility user. Each corresponding user interface element 870A-870D may include a count that indicates a number of metro areas or geographic locations where the target interconnection facility user for the corresponding user interface element 870A-870D is located, but the particular interconnection facility user for which interconnection user interface 850 is generated is not interconnected. In other words, user interface elements 870A-870D may include counts of metro areas or geographic locations that are shared by the particular interconnection facility user and a target interconnection facility user but no interconnection exists between the two users.

In some examples, a user interface element, such as user interface element 868D, may include current connections user interface element 872 and other metro opportunities user interface element 874. User interface element 872 may include count of metro areas or geographic locations that a target interconnection facility user associated with user interface element 868D already has connections with a particular interconnection facility user for which interconnection user interface 850 is generated. User interface element 874 may include a count of metro areas or geographic locations where a particular interconnection facility user for which interconnection user interface 850 is generated may establish an interconnection with a target interconnection facility user associated with user interface element 868D. In this way, user interface elements 872 and 874 may provide more granular information about existing interconnections and interconnection opportunities for a particular target interconnection facility user.

Although not shown in FIG. 8, interconnection user interface 850 may include one or more user interface elements that allow a particular interconnection facility user to provide user input, in response to viewing an interconnection opportunity, which causes a message to be sent from the particular interconnection facility user to a target interconnection facility user. The message may indicate a request to establish an interconnection based on an interconnection opportunity presented by interconnection user interface 850. Interconnection user interface 850 may also include one or more other user interface elements (not shown) to communicate with a programmable network platform and/or one or more other target services users.

Figure 9:
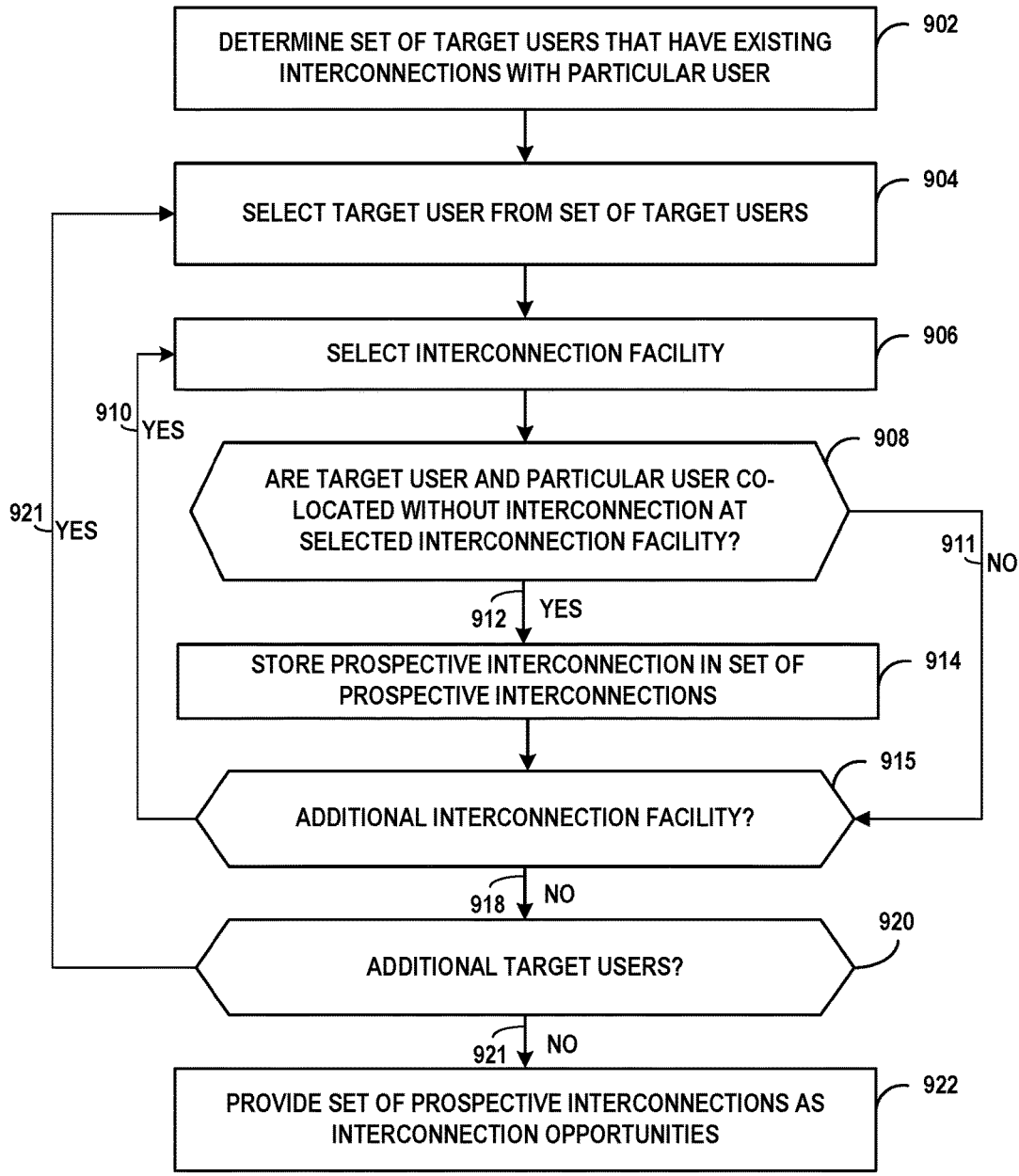
FIG. 9 is a flow diagram illustrating example operations of a computing device that determines interconnection opportunities based on one or more prospective interconnections, in accordance with techniques of the disclosure.

FIG. 9 is a flow diagram illustrating example operations of a computing device that determines interconnection opportunities based on one or more prospective interconnections, in accordance with techniques of the disclosure. For purposes of illustration only, the example operations are described below within the context of interconnect engine 134, as shown in FIG. 2. To generate a set of interconnection opportunities for a particular interconnection facility user, interconnect engine 134 may determine a set of target interconnection facility users that have existing interconnections with the particular interconnection facility user (902). For instance, interconnect engine 134 may receive, based on a unique interconnection facility user identifier, the set of target interconnection facility users from customer data or a big data platform that includes the customer data.

To identify an interconnection opportunity based on a prospective interconnection, interconnect engine 134 may select a target interconnection facility user from the set of interconnection facility users (904). Interconnect engine 134 may then select an interconnection facility from a set of one or more interconnection facilities at which the particular interconnection facility user has a connection (906). Interconnect engine 134 may determine whether the selected target interconnection facility user and the particular interconnection facility user are each co-located without an interconnection at the selected interconnection facility (908). If the selected target interconnection facility user and the particular interconnection facility user are each co-located without an interconnection at the selected interconnection facility, interconnect engine 134 may store a prospective interconnection in a set of prospective interconnections (914). If, however, the selected target interconnection facility user and the particular interconnection facility user are not co-located at the selected interconnection facility or already have an interconnection at the selected interconnection facility (911), interconnect engine 134 may select a next interconnection facility (906). For instance, interconnect engine 134 may not store a prospective interconnection and select a next interconnection facility.

Interconnect engine 134 may determine whether any additional interconnection facilities at different locations remain for processing (915). If additional interconnection facilities remain that have not yet been evaluated for interconnection opportunities (910), then interconnect engine 134 may select the next interconnection facility in the set of interconnection facilities. If additional interconnection facilities do not remain, such that each of the interconnection facilities in the set of interconnection facilities have been evaluated for interconnection opportunities (918), interconnect engine 134 may determine whether additional target interconnection facility users remain that have not been evaluated for interconnection opportunities (920). If additional target interconnection facility users remain that have not been evaluated for interconnection opportunities remain (921), then interconnect engine 134 may select the next target interconnection facility user (904). If additional target interconnection facility users do not remain, such that each of the target interconnection facility users have been evaluated for interconnection opportunities (921), then interconnect engine 134 may provide the set of prospective interconnections as interconnection opportunities to the particular interconnection facility user (922). For instance, the interconnection opportunities may be included in a graphical user interface that is output for display by a computing device of the particular interconnection facility user.

Figure 10:
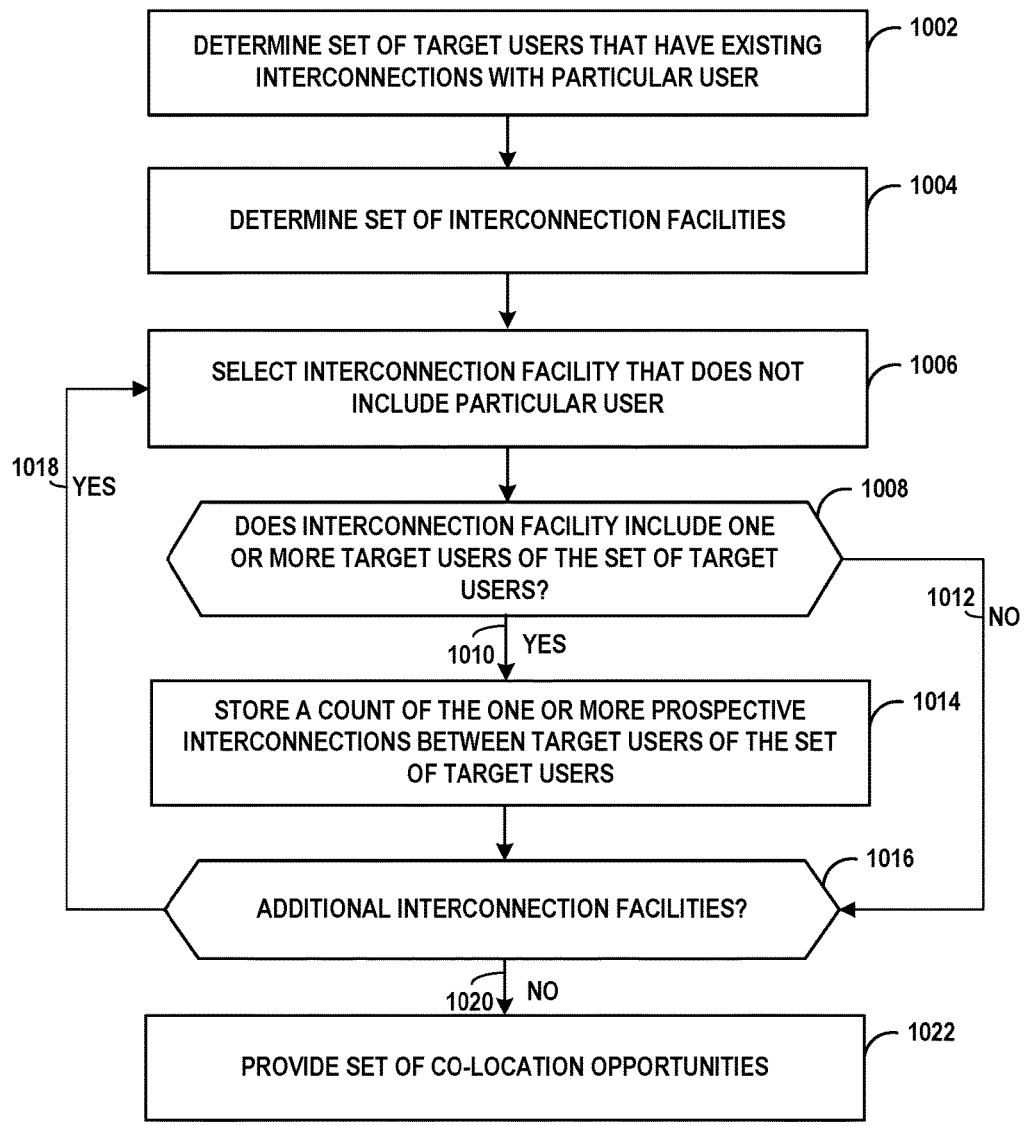
FIG. 10 is a flow diagram illustrating example operations of a computing device that determines co-location opportunities based on one or more prospective interconnections, in accordance with techniques of the disclosure.

FIG. 10 is a flow diagram illustrating example operations of a computing device that determines co-location opportunities based on one or more prospective interconnections, in accordance with techniques of the disclosure. For purposes of illustration only, the example operations are described below within the context of interconnect engine 134, as shown in FIG. 2. To generate a set of co-location opportunities for a particular interconnection facility user, interconnect engine 134 may determine a set of target interconnection facility users that have existing interconnections with the particular interconnection facility user (1002). For instance, interconnect engine 134 may receive, based on a unique interconnection facility user identifier, the set of target interconnection facility users from customer data or a big data platform that includes the customer data.

To identify a set of co-location opportunities, interconnect engine 134 may determine a set of interconnection facilities (1004). In some examples, each of the interconnection facilities may be managed, controlled, or otherwise operated by a programmable network controller. Interconnect engine 134 may select an interconnection facility from the set of interconnection facilities that does not include the particular interconnection facility user (1006). For instance, interconnect engine 134 may select an interconnection facility from the set of interconnection facilities where the interconnection facility user does not have a connection with or is not co-located at the interconnection facility. Interconnect engine 1008 may determine whether the selected interconnection facility includes one or more of the set of target interconnection facility users (1008). If the selected interconnection facility includes one or more of the set of target interconnection facility users (e.g., the one or more of the set of target interconnection facility users each have a connection with or are co-located at the interconnection facility) (1010), interconnect engine 134 may store a count of one or more prospective interconnections that may be established between the particular interconnection facility user and the one or more of the set of target interconnection facility users (1014). In some examples, rather than storing a count, interconnect engine 134 may store a score that is based at least in part on the count, such as a score that represents a weighted count, wherein the weighting is based on one or more criteria.

Interconnect engine 134 may determine whether one or more interconnection facilities remain, which have not yet been evaluated for co-location opportunities for the particular interconnection facility user (1016). If another service exchange remains, interconnect engine may select the interconnection facility which does not include the particular interconnection facility user (1006). If another service exchange does not remain, such that all interconnection facilities that do not include the particular interconnection facility user have been evaluated for co-location opportunities, then interconnect engine 134 may provide a set of co-locations (1022). For instance, the co-location opportunities may be included in a graphical user interface that is output for display by a computing device of the particular interconnection facility user.

The techniques described herein may be implemented in hardware, software, firmware, or any combination thereof.

Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    identifying, by an interconnect engine executing at a computing device, based at least in part on querying telemetry data that indicates interconnections established between interconnection facility customers within a plurality of geographically distributed interconnection facilities by an interconnection facility provider, a set of one or more existing interconnections between a first customer network of a particular interconnection facility customer and respective, first customer networks of one or more target interconnection facility customers within a first interconnection facility of the plurality of geographically distributed interconnection facilities, wherein at least one of the set of one or more existing interconnections is configured in network infrastructure of the first interconnection facility, the first interconnection facility comprising a first data center located at a first geographic location, and wherein the first customer network of the particular interconnection facility customer and the respective, first customer networks of the one or more target interconnection facility customers are co-located within the first data center;
    generating, by the interconnect engine and based at least in part on the set of one or more existing interconnections, a set of one or more prospective interconnections between a second customer network of the particular interconnection facility customer and respective, second customer networks of the one or more target interconnection facility customers, wherein the set of one or more prospective interconnections are not included in the telemetry data, and wherein the set of one or more prospective interconnections are configurable within network infrastructure of a second interconnection facility of the interconnection facilities, the second interconnection facility comprising a second, different data center located at a different geographic location, wherein the set of one or more prospective interconnections are configurable in network infrastructure of the second interconnection facility to provide interconnections between the second customer network of the particular interconnection facility customer and respective, second customer networks of at least one of the one or more target interconnection facility customers, and wherein the second customer network of the particular interconnection facility customer and the respective, second customer networks of the at least of the one or more target interconnection facility customers are co-located within the second data center; and
    outputting, by the interconnect engine and for display to the particular interconnection facility customer, data indicating the set of one or more prospective interconnections.

2. The method of claim 1,
    wherein generating the set of one or more prospective interconnections further comprises:
        for each respective target interconnection facility customer of the one or more target interconnection facility customers:
            selecting the respective target interconnection facility customer;
            selecting the second interconnection facility from the plurality of geographically distributed interconnection facilities;
            in response to determining that the second customer network of the particular interconnection facility customer and the respective, second customer networks of the respective target interconnection facility customer are each connected to the second interconnection facility, but the second customer network of the particular interconnection facility customer and the respective, second customer networks of the one or more target interconnection facility customers are not interconnected at the second interconnection facility, storing a prospective interconnection for the second customer network of the particular interconnection facility customer and to at least one of the respective, second customer networks of the respective target interconnection facility customer in the set of one or more prospective interconnections; and
    wherein outputting the data indicating the set of one or more prospective interconnections further comprises:

generating for display, based at least in part on the set of one or more prospective interconnections, the set of one or more prospective interconnections within the second interconnection facility between the second customer network of the particular interconnection facility customer and the at least one of the respective, second customer networks of the one or more target interconnection facility customers.

3. The method of claim 2, wherein generating for display the set of one or more prospective interconnections further comprises:
generating for display, a graphical user interface comprising:
a first plurality of graphical user elements, each of the first plurality of graphical user elements corresponding to the second interconnection facility; and
a second plurality of graphical user elements, each of the second plurality of graphical user elements indicating a respective interconnection, of the set of one or more prospective interconnections for the second customer network of the particular interconnection facility customer to establish with at least one of the respective, second customer networks of the one or more of the target interconnection facility customers.

4. The method of claim 1,
wherein generating the set of one or more prospective interconnections further comprises:
in response to determining a count of respective prospective interconnections between the respective, second customer networks of the one or more target interconnection facility customers that are connected to the second interconnection facility and the second customer network of the particular interconnection facility customer, storing a respective score, based at least in part on the count, for the second interconnection facility; and
wherein outputting the data indicating the set of one or more prospective interconnections further comprises:
generating for display, based at least in part on the respective score for the respective prospective interconnections of the second interconnection facility, one or more indications of the second interconnection facility for the particular interconnection facility customer to establish interconnections.

5. The method of claim 4, wherein generating for display one or more indications of the second interconnection facility for the particular interconnection facility customer to establish interconnections further comprises:
generating for display, a graphical user interface comprising:
a first plurality of graphical user elements, each of the first plurality of graphical user elements corresponding to the second interconnection facility; and
a second plurality of graphical user elements, each of the second plurality of graphical user elements indicating the respective score of the second interconnection facility.

6. The method of claim 1, wherein the interconnections of the interconnection facility customers are each at least one of a physical connection or a logical connection, wherein the logical connection is at least one of data link, network, or transport-layer connection.

7. The method of claim 1, wherein the data indicating the set of one or more prospective interconnections comprises at least one weighted score based at least in part on a weight and one or more of the set of one or more prospective interconnections.

8. The method of claim 1, further comprising:
calculating a revenue estimation based on a number of prospective interconnection facility customers associated with at least one interconnection facility of the plurality of geographically distributed interconnection facilities, a sales average for the particular interconnection facility customer, and a conversion rate for the particular interconnection facility customer; and
outputting, for display, the revenue estimation.

9. A non-transitory computer-readable storage medium encoded with instructions that, when executed, cause at least one processor of a computing device to:
identify, based at least in part on querying telemetry data that indicates interconnections established between interconnection facility customers within a plurality of geographically distributed interconnection facilities by an interconnection facility provider, a set of one or more existing interconnections between a first customer network of a particular interconnection facility customer and respective, first customer networks of one or more target interconnection facility customers within a first interconnection facility of the plurality of geographically distributed interconnection facilities, wherein the at least one of the set of one or more existing interconnections is configured in network infrastructure of the first interconnection facility, the first interconnection facility comprising a first data center located at a first geographic location, and wherein the first customer network of the particular interconnection facility customer and the respective, first customer networks of the one or more target interconnection facility customers are co-located within the first data center;
generate, based at least in part on the set of one or more existing interconnections, a set of one or more prospective interconnections between a second customer network of the particular interconnection facility customer and respective, second customer networks of the one or more target interconnection facility customers, wherein the set of one or more prospective interconnections are not included in the telemetry data, and wherein the set of one or more prospective interconnections are configurable within network infrastructure of a second interconnection facility comprising a second, different data center located at a different geographic location, wherein the set of one or more prospective interconnections are configurable in network infrastructure of the second interconnection facility to provide interconnections between the second customer network of the particular interconnection facility customer and respective, customer networks of at least one of the one or more target interconnection facility customers, and wherein the second customer network of the particular interconnection facility customer and the respective, second customer networks of the at least one the one or more target interconnection facility customers are co-located within the second data center; and
output, for display to the particular interconnection facility customer, data indicating the set of one or more prospective interconnections.

10. A computing device comprising:
at least one computer processor; and
a memory comprising instructions that when executed by the at least one computer processor cause the at least one computer processor to:
identify based at least in part on querying telemetry data that indicates interconnections established between interconnection facility customers within a plurality of geographically distributed interconnection facilities by an interconnection facility provider, a set of one or more existing interconnections between a first customer network of a particular interconnection facility customer and respective, first customer networks of one or more target interconnection facility customers within a first interconnection facility of the plurality of geographically distributed interconnection facilities, wherein at least one of the set of one or more existing interconnections is configured in network infrastructure of the first interconnection facility, the first interconnection facility comprising a first data center located at a first geographic location, and wherein the first customer network of the particular interconnection facility customer and the respective, first customer networks of the one or more target interconnection facility customers are co-located within the first data center;

generate, based at least on part on the set of one or more existing interconnections, a set of one or more prospective interconnections between a second customer network of the particular interconnection facility customer and respective, second customer networks of the one or more target interconnection facility customers, wherein the set of one or more prospective interconnections are not included in the telemetry data, and wherein the set of one or more prospective interconnections are configurable within network infrastructure of a second interconnection facility of the interconnection facilities, the second interconnection facility comprising a second, different data center located at a different geographic location, wherein the set of one or more prospective interconnections are configurable in network infrastructure of the second interconnection facility to provide interconnections between a second customer network of the particular interconnection facility customer and respective, second customer networks of at least one of the one or more target interconnection facility customers, and wherein the second customer network of the particular interconnection facility customer and the respective, second customer networks of the at least of the one or more target interconnection facility customers are co-located within the second data center; and output, for display to the particular interconnection facility customer, data indicating the set of one or more prospective interconnections.

11. The computing device of claim 10, wherein the instructions to generate the set of one or more prospective interconnections further comprise instructions that when executed, cause the at least one processor of the computing device to:

for each respective target interconnection facility customer of the one or more target interconnection facility customers:

select the respective target interconnection facility customer;

select the second interconnection facility from the plurality of geographically distributed interconnection facilities;

in response to determining that the second customer network of the particular interconnection facility customer and the respective, second customer networks of the respective target interconnection facility customer are each connected to the second interconnection facility, but the second customer network of the particular interconnection facility customer and the respective, second customer networks of the one or more target interconnection facility customers are not interconnected at the second interconnection facility, store a prospective interconnection for the second customer network of the particular interconnection facility customer and to at least one of the respective, second customer networks of the respective target interconnection facility customer in the set of one or more prospective interconnections; and wherein the instructions to output the data indicating the set of one or more prospective interconnections further comprise instructions that when executed, cause the at least one processor of the computing device to:

generate for display, based at least in part on the set of one or more prospective interconnections, the set of one or more prospective interconnections within the second interconnection facility between the second customer network of the particular interconnection facility customer and the at least one of the respective, second customer networks of the one or more target interconnection facility customers.

12. The computing device of claim 11, wherein the instructions to generate for display the set of one or more prospective interconnections further comprise instructions that when executed, cause the at least one processor of the computing device to:

generate for display, a graphical user interface comprising:

a first plurality of graphical user elements, each of the first plurality of graphical user elements corresponding to the second interconnection facility of the plurality of geographically distributed interconnection facilities; and a second plurality of graphical user elements, each of the second plurality of graphical user elements indicating a respective interconnection, of the set of one or more prospective interconnections for the second customer network of the particular interconnection facility customer to establish with at least one of the respective, second customer networks of the one or more of the target interconnection facility customers.

13. The computing device of claim 10, wherein the instructions to generate for display the set of one or more prospective interconnections further comprise instructions that when executed, cause the at least one processor of the computing device to:

wherein the instructions to generate the set of one or more prospective interconnections further comprise instructions that when executed, cause the at least one processor of the computing device to:

select the second interconnection facility;

in response to determining a count of respective prospective interconnections between the respective, second customer networks of the one or more target interconnection facility customers that are connected to the second interconnection facility and the second customer network of the particular interconnection facility customer, store a respective score, based at least in part on the count, for the second interconnection facility; and wherein the instructions to output the data indicating the set of one or more prospective interconnections further comprise instructions that when executed, cause the at least one processor of the computing device to:

generate for display, based at least in part on the respective score for the respective prospective interconnections of the second interconnection facility, one or more indications of the second interconnection facility for the particular interconnection facility customer to establish interconnections.

14. The computing device of claim 10, wherein the instructions to generate for display one or more indications of the second interconnection facility for the particular interconnection facility customer to establish interconnections, cause the at least one processor of the computing device to:
generate for display, a graphical user interface comprising:
a first plurality of graphical user elements, each of the first plurality of graphical user elements corresponding to the second interconnection facility; and
a second plurality of graphical user elements, each of the second plurality of graphical user elements indicating the respective score of the second interconnection facility.

15. The computing device of claim 10, wherein the interconnections of the interconnection facility customers are each at least one of a physical connection or a logical connection, wherein the logical connection is at least one of data link, network, or transport-layer connection.

16. The computing device of claim 10, wherein the data indicating the set of one or more prospective interconnections comprises at least one weighted score based at least in part on a weight and one or more of the set of one or more prospective interconnections.

17. The computing device of claim 10, wherein the memory comprises instructions that when executed by the at least one computer processor cause the at least one computer processor to:
calculate a revenue estimation based on a number of prospective interconnection facility customers associated with at least one interconnection facility of the plurality of geographically distributed interconnection facilities, a sales average for the particular interconnection facility customer, and a conversion rate for the particular interconnection facility customer; and
output, for display, the revenue estimation.

18. A method comprising:
identifying, by an interconnect engine executing at a computing device, based at least in part on querying telemetry data that indicates interconnections established between interconnection facility customers within a plurality of geographically distributed interconnection facilities by an interconnection facility provider, a set of one or more existing interconnections between a first customer network of a particular interconnection facility customer and respective, first customer networks of a set of target interconnection facility customers within a first interconnection facility of the plurality of geographically distributed interconnection facilities, wherein at least one of the set of one or more existing interconnections is configured in network infrastructure of the first interconnection facility, the first interconnection facility comprising a first data center located at a first geographic location, and wherein the first customer network of the particular interconnection facility customer and the respective, first customer networks of the one or more target interconnection facility customers within the first data center;
for each respective target interconnection facility customer of the set of target interconnection facility customers:
selecting the respective target interconnection facility customer;
selecting the second interconnection facility from the set of target interconnection facility customers;
in response to determining that a second customer network of the particular interconnection facility customer and a second customer network of the respective target interconnection facility customer is connected to the second interconnection facility, but the second customer network of the particular interconnection facility customer and the second customer network of the respective target interconnection facility customer is not interconnected at the second interconnection facility, storing a prospective interconnection for the second customer network of the particular interconnection facility customer and the second customer network of the respective target interconnection facility customer in a set of one or more prospective interconnections; and
generating for display, based at least in part on the set of one or more prospective interconnections, the set of one or more prospective interconnections within the second interconnection facility between the second customer network of the particular interconnection facility customer and the at least one of the respective, second customer networks of the one or more of the set of target interconnection facility customers.

19. A method comprising:
identifying, by an interconnect engine executing at a computing device, based at least in part on querying telemetry data that indicates interconnections established between interconnection facility customers within a plurality of interconnection facilities by an interconnection facility provider, a set of one or more existing interconnections between a first customer network of a particular interconnection facility customer and respective, first customer networks of one or more target interconnection facility customers within a first interconnection facility of the plurality of geographically distributed interconnection facilities, wherein at least one of the set of one or more existing interconnections is configured in network infrastructure of the first interconnection facility, the first interconnection facility comprising a first data center located at a first geographic location, and wherein the first customer network of the particular interconnection facility customer and the respective, first customer networks of the one or more target interconnection facility customers are co-located within the first data center;
in response to determining a count of respective prospective interconnections between the respective, second customer networks of the one or more target interconnection facility customers that are connected to the second interconnection facility and the second customer network of the particular interconnection facility customer, storing a respective score, based at least in part on the count, for the second interconnection facility; and
generating for display, based at least in part on the respective score for the respective prospective interconnections of the second interconnection facility, one or more indications of the second interconnection facility for the particular interconnection facility customer to establish interconnections.

* * * * *